US008891737B2

(12) United States Patent
Vendrow et al.

(10) Patent No.: US 8,891,737 B2
(45) Date of Patent: *Nov. 18, 2014

(54) CALL MANAGEMENT INTERFACES

(71) Applicant: RingCentral, Inc., San Mateo, CA (US)

(72) Inventors: Vlad Vendrow, Redwood Shores, CA (US); Vladimir Shmunis, South Lake Tahoe, CA (US); Vi Chau, San Francisco, CA (US); Praful Shah, Los Altos Hills, CA (US); Natalie Nayberg, San Carlos, CA (US)

(73) Assignee: RingCentral, Inc., San Mateo, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/733,103

(22) Filed: Jan. 2, 2013

(65) Prior Publication Data
US 2013/0189942 A1 Jul. 25, 2013

Related U.S. Application Data

(63) Continuation of application No. 12/905,537, filed on Oct. 15, 2010, now Pat. No. 8,355,496.

(60) Provisional application No. 61/259,505, filed on Nov. 9, 2009.

(51) Int. Cl.
*H04M 11/04* (2006.01)
*H04W 4/22* (2009.01)
*H04L 12/66* (2006.01)
*H04M 3/42* (2006.01)

(52) U.S. Cl.
CPC .................. *H04W 4/22* (2013.01); *H04L 12/66* (2013.01); *H04M 3/4234* (2013.01); *H04M 2201/42* (2013.01); *H04M 3/42161* (2013.01)
USPC ............................................ 379/45; 379/198

(58) Field of Classification Search
CPC ...... H04W 84/16; H04Q 7/26; H04M 3/5116; H04M 3/42323; H04M 1/72536
USPC ..................................... 455/555; 379/45, 198
See application file for complete search history.

(56) References Cited

U.S. PATENT DOCUMENTS 6,587,555 B1 7/2003 Cripe et al.
2007/0047534 A1 3/2007 Hakusui (Continued)

FOREIGN PATENT DOCUMENTS

JP 1054889 A 3/1989
KR 2006018155 A 2/2006

OTHER PUBLICATIONS

International Preliminary Report on Patentability from International Application No. PCT/US2010/052880 dated May 24, 2012, 5 pages.

(Continued)

*Primary Examiner* — Creighton Smith
(74) *Attorney, Agent, or Firm* — Fish & Richardson P.C.

(57) ABSTRACT

Systems, methods and computer program products for generating and displaying various user interfaces for configuring one or more call handling rules associated with managing virtual PBX services rendered at an extension are described. The user interfaces can be used to configure virtual PBX services for a single- or multi-extension environment. The virtual PBX services can provide, for example, a main number, and calls made to the main number can be managed according to one or more sets of call handling rules associated with the virtual PBX services and which can be configured through the user interfaces. The user interfaces can be webbased interfaces accessible through a browser, and can be accessed only after a user or administrator has setup and activated the virtual PBX services.

20 Claims, 18 Drawing Sheets

(56) References Cited

U.S. PATENT DOCUMENTS

| | | |
|---|---|---|
| 2008/0298567 A1 | 12/2008 | Guile |
| 2010/0035594 A1 | 2/2010 | Vendrow et al. |
| 2010/0099390 A1 | 4/2010 | Vendrow et al. |
| 2010/0130213 A1 | 5/2010 | Vendrow et al. |
| 2010/0130228 A1 | 5/2010 | Vendrow et al. |
| 2011/0053643 A1 | 3/2011 | Shmunis |
| 2011/0110511 A1 | 5/2011 | Vendrow et al. |
| 2011/0184408 A1 | 7/2011 | Konesky et al. |

OTHER PUBLICATIONS

Korean Authorized Officer Hyung Hee Cho, Notification of Transmittal of the International Search Report and the Written Opinion of the International Searching Authority, or the Declaration for Application No. PCT/US2010/052880, dated Jun. 27, 2011, 8 pages.

European Search Report in EP 10 82 8752.5, mailed Mar. 7, 2014, 3 pages.

Communication Pursuant to Article 94(3) EPC in EP 10 82 8752.5, mailed Mar. 28, 2014, 6 pages.

Edit Forwarding Phone Numbers

Ring my phone numbers:

○ 🏢 → 📱 → 🏠 Sequentially

● ○ → 📱 → 🏠 Simultaneously — 334b

334a

334c — Drag and drop fields to change the order of the phones.

| Select | Type | Phone Number | Ring For | Active | Advanced |
|---|---|---|---|---|---|
| ✏️ 334e | Mobile ▶ | 415-555-1212 — 334h | 4 Rings ▶ | ON — 334l | ⚙️ 336a |
| ✏️ 334f | Home ▶ | 415-878-3732 — 334i | 4 Rings ▶ | ON — 334m | ⚙️ 336b |
| ☐ 334g | Other ▶ | 415-585-2844 — 334j | 4 Rings ▶ | OFF — 334n | ⚙️ 336c |

⊕ Add Phone      🔗 Group ⓘ      🗑️ Delete

[Cancel]   [Save]

Phone Details

- 342a → Device Nickname: [Linksys SPA 942]
- 342b → Device Visibility: [101 - John Smith ▼]
- 342c → Phone Number: (415) 494-8237
  San Francisco, CA
- 342d → Extension: [101 - John Smith ▼]
- 342e → Calling Plan: Unlimited

- 342f → Caller ID: [Digital Line: (415) 494-8237 ▼]
- 342g → Alternate: [Digital Line: (415) 494-8237 ▼]

- 342k → [E911 Dialing Address  >]

- 342h → New Message Alert: [Disabled ▼]
- 342i → 7-Digit Dialing: [415 ▼]
- 342j → Bandwidth Usage: [Low ▼]

Status: Offline
Login Number: -

[Cancel] [Save]

E911 Registered Location

Please enter the address that should be used when 911 is dialed from the following device:

● Register in the US    ○ Register outside of the US

| | |
|---|---|
| Customer Name: | VC |
| Street Address: | 1245 Lakeside Drive |
| Apartment / Suite #: | 3004 |
| City: | Sunnyvale |
| State: | California ▼ |
| Zip Code: | 94085 |
| Country: | United States ▼ |

344a → ☐ By selecting this checkbox and clicking "I Accept" below, you confirm that you have read, agree, and understand how E911 differes from regular 911.

[ Cancel ]   [ I Accept ]

E911 Registered Location

Please enter the address that should be used when 911 is dialed from the following device:

- ● Register in the US
- ○ Register outside of the US

| | |
|---|---|
| Customer Name: | VC |
| Street Address: | 1245 Lakeside Drive |
| Apartment / Suite #: | 3004 |
| City: | Sunnyvale |
| State: | California |
| Zip Code: | 94085 |
| Country: | United States |

☐ By selecting this checkbox and clicking "I Accept" below, you confirm that you have read, agree, and understand how E911 differes from regular 911.

Close ⊗

344c— (1) Internet connection failure. If the connection to the Internet over which your RingCentral DigitalLine Service is provided were interrupted. you would not have access to RingCentral DigitalLine Service during that interruption and therefore would not have access to 911 service during that interruption.

(2) Number Flexibility & Service Portability. Traditional 911 service automatically sends your 911 call to the appropriate

[ Cancel ]  [ I Accept ]

FIG. 3N

CALL MANAGEMENT INTERFACES

TECHNICAL FIELD

This subject matter relates to managing communications for devices.

BACKGROUND

Competition among telephone service providers in conjunction with recent technological advancements has resulted in the availability of an increased number of calling features and services that can be provided to telecommunications subscribers and users. Services and features typically are provisioned by the telecommunications network or on-premise servers and not the telephone device itself.

SUMMARY

Systems, methods and computer program products for generating and displaying various user interfaces for configuring one or more call handling rules associated with managing virtual PBX services rendered at an extension are described. The user interfaces can be used to configure virtual PBX services for a single- or multi-extension environment. The virtual PBX services can provide, for example, a main number, and calls made to the main number can be managed according to one or more sets of call handling rules associated with the virtual PBX services and which can be configured through the user interfaces. The user interfaces can be web-based interfaces accessible through a browser, and can be accessed only after a user or administrator has setup and activated the virtual PBX services.

In some implementations, a method can be provided that includes receiving a user request to access profile information associated with an extension on a virtual private branch exchange (PBX) network; retrieving one or more configuration parameters associated with the extension; presenting a user interface including displaying the one or more retrieved configuration parameters in the interface; receiving a user command to update at least one configuration parameter; and updating the profile information based on the at least one updated configuration parameter.

In some implementations, a method can be provided that includes enabling a user interface on a communication device to communicate with an application server rendering virtual PBX services to an extension on a PBX network; receiving a user command from the communication device through the user interface; and rendering the virtual PBX services to the extension based on the received web application commands.

In some implementations, a system can be provided that includes a communication device to receive incoming calls at an extension on a PBX network and to initiate a call session for each incoming call; and an application server to: render virtual PBX services at the extension, the virtual PBX services having one or more configuration parameters for configuring the call session; and present a user interface configured to receive a user command to access the one or more configuration parameters.

The details of one or more implementations of call management of location-aware mobile devices are set forth in the accompanying drawings and the description below. Other features, objects, and advantages of the techniques will be apparent from the description and drawings, and from the claims.

DESCRIPTION OF DRAWINGS

FIG. 3I shows an example of an edit forwarding phone number interface for configuring one or more call forwarding rules associated with an extension.

FIG. 3L shows an example of a phone detail user interface for configuring one or more parameters associated with an extension device.

FIG. 3M shows an example of a E-911 location registration interface for registering an extension for obtaining enhanced emergency services.

FIG. 3N shows an example of a scrollable interface displaying information on emergency services.

Like reference symbols in the various drawings indicate like elements.

DETAILED DESCRIPTION

Figure 1:
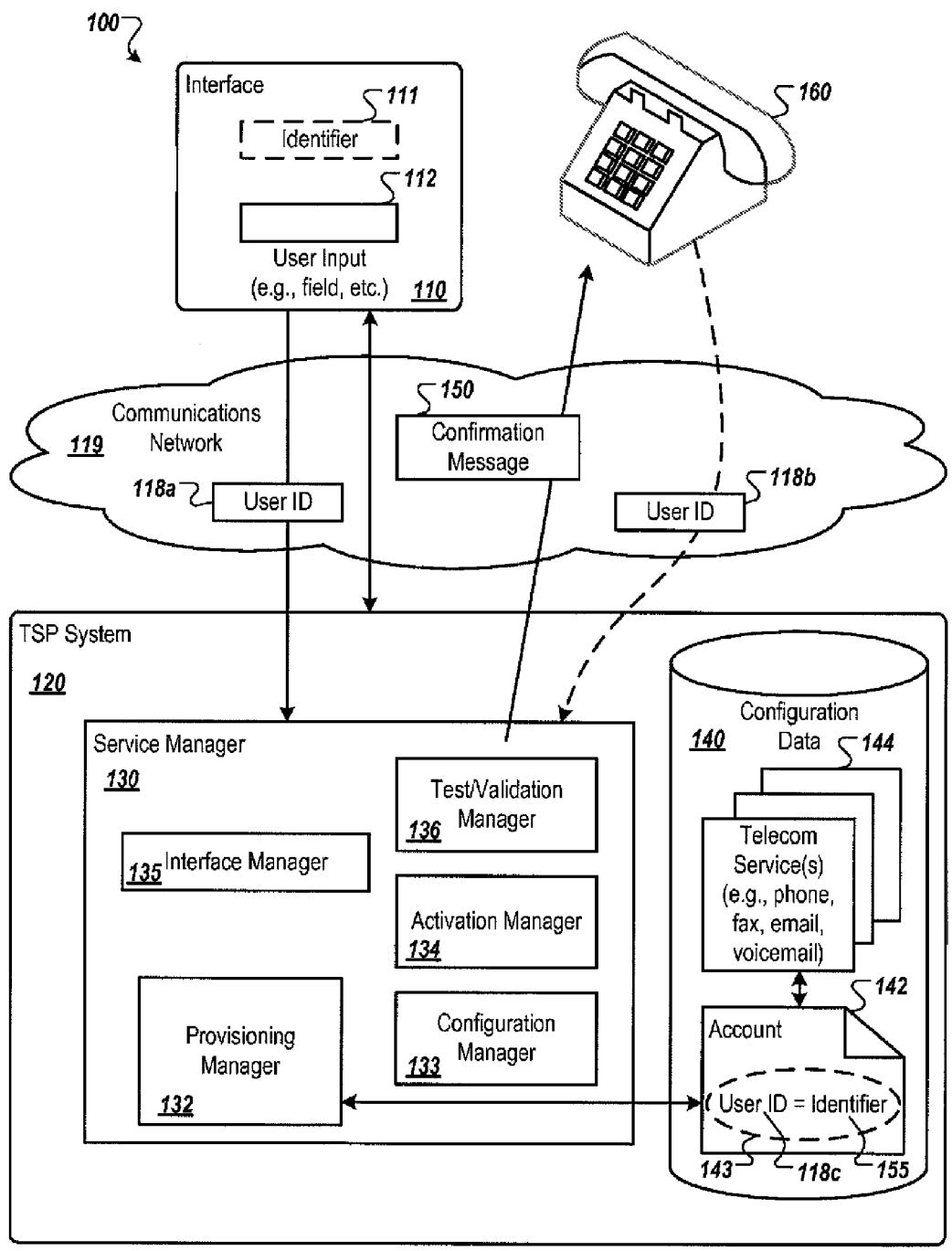
FIG. 1 illustrates an example of a virtual PBX service provider system.

FIG. 1 illustrates an example of a virtual PBX service provider system 100. As shown in FIG. 1, the virtual PBX service provider system 100 can include a telecommunications service provider (TSP) system 120. The TSP system 120 can include a service manager 130 and a repository 140. The service manager 130 can be configured to receive data representing a request to activate a subset of virtual PBX services. The data can include user identification information, such as user ID 118a or user ID 118b, either of which can be sufficient to activate the virtual PBX services. The TSP system 120 can be configured to receive user IDs 118a and 118b, such as from a communications network 119 from an interface 110 on a mobile device.

The user IDs 118a and 118b can represent a telephone number for phone 160 or a mobile device transmitting an activation request to activate the virtual PBX services on the mobile device. In some implementations, the mobile device can be reachable via an identifier 155, and the identifier 155 can be used as an extension for which the virtual PBX services can be rendered. The user IDs 118a and 118b can represent the same user identification number, but indicate that the user identification number may have been obtained by different techniques (e.g., by way of interface 110 or by way of call data).

An identifier (e.g., identifier 155) can be a telephone number (e.g., a toll-free telephone number, such as a main telephone line) for accessing virtual PBX services. An identifier can also be an email address, or any other symbol (or set of symbols) that represents a common contact identifier for a group of contact identifiers, such as a group of extension numbers for a PBX. Prior to activation, an identifier can be associated with a subset of virtual PBX services of TSP system 120 that are yet to be provisioned and activated. A "user identifier" (e.g., user ID 118c) can refer to a contact identifier (such as the phone number of the phone 160 or mobile device) that can be associated with an extension number in a group of extension numbers. A "user identifier" can also be a facsimile number for a fax machine, an email address of an email account, or a voice mail address, to name a few examples.

A mobile device can communicate with the TSP system 120 and submit information input by the user using the interface 110. As discussed above, the user ID 118a can be contact information, name, telephone number, email address, or a main telephone number selected by the user trying to activate the account. The repository 140 can be configured to store data representing configuration data 144 for configuring the virtual PBX services. In some implementations, configuration data 144 can be pre-configured to provide a discrete set of virtual PBX services that, for example, can be activated by the service manager 130 using user IDs 118a and 118b, without requiring other information. Configuration data 144 can include an identifier 155 for accessing the virtual PBX services, where the identifier 155 can be associated with other configuration data 144 either prior to, or after, the TSP system 120 receives the data representing the request to activate or access the virtual PBX services.

In some implementations, the TSP system 120 can be configured to generate signals for transmission to the phone 160 to confirm successful activation of the telecommunications services. In some implementations, the signals can be of the form of a confirmation message that is sent to the mobile device initiating the activation request. For example, the confirmation message 150 can include signals that cause the phone 160 to ring, among other things, thereby confirming that a call to the identifier 155 can be routed to a communications device associated with user IDs 118a or 118b. As described above, the identifier 155 can specify a main telephone number (or main number) for accessing a subset of virtual PBX services.

In some implementations, configuration data and related parameters for configuring the virtual PBX services can be accessed via an internet browser. For example, the user or administrator administrating the virtual PBX services can access the configuration data and related parameters by logging onto account 142 using the identifier 155. The user or administrator can be authenticated to confirm authorization before the configuration and related parameters can be viewed and modified. Once authenticated, the administrator can be presented with a call handling interface (as will be discussed in greater detail below) through which configuration data associated with the virtual PBX services can be accessed. In some implementations, the configuration data can include parameters pertaining to call handling rules for handling incoming calls based on the call handling rules. For example, when an outside caller calls the virtual PBX main number for a small business, and chooses an extension, the extension user associated with that extension can be reached on a predefined mobile device, home telephone, office phone or other phone type according to the call handling rules. In some implementations, the user or administrator can activate, deactivate, add, remove or modify one or more call handling rules or configuration parameters associated with the virtual PBX services In some implementations, the TSP system 120 can generate an interface 110 to receive user input, which can be a field 112 configured to accept data, such as user identification information (e.g., such as a user identifier, which can be represented as user ID 118a). Optionally, the TSP system 120 can generate a representation 111 of an identifier to present in the interface 110. The representation 111 can be a toll-free number as a main telephone line associated with the virtual PBX services. The interface 110 can be accessible as a webpage at a particular URL.

In some implementations, the interface 110 can be generated by an application on a mobile device. The mobile device can receive the information such as the main identification number from the TSP system 120 (or the server), and present the main identification number in the interface 110 presented by the virtual PBX services application running on the mobile device. In some implementations, the TSP system 120 or the virtual PBX services application running on the mobile device can present field 112 simultaneously (or substantially simultaneously) to the presentation of representation 111 of the identifier. In some implementations, the TSP system 120 can configure configuration data 144 (or a portion thereof) prior to presenting either field 112 or representation 111 of an identifier or both. As such, little or a negligible amount of information can be sufficient to provision a subset of virtual PBX services, which can be defined by the pre-configured portions of the configuration data 144. In some implementations, the subset of virtual PBX services can operate as a default set of services, thereby reducing or eliminating the need for the user to perform an initial and/or a complicated configuration of telecommunications services. Further, the TSP system 120 or the virtual PBX services application running on the mobile device can maintain the presentation of interface 110 during the activation of the subset of virtual PBX services, without transitioning to other interfaces. In view of the foregoing, a discrete set of virtual PBX services can be provisioned and activated without transitioning away from the interface 110. In some implementations, this can simplify the procurement of virtual PBX services.

In some implementations, the TSP system 120 can test and validate successful activation of the subset of virtual PBX services, and then can confirm the validation by, for example, generating a call including a confirmation message 150 to a phone 160 or the mobile device from which the activation request was sent. If a user identifier is entered into interface 110, then TSP system 120 can generate a call to the user identifier number to confirm activation of the subset of virtual PBX services. In some instances, the call includes a confirmation message 150 to the user identification number or the mobile device sending the activation request, substantially simultaneously to the presentation of either field 112 or representation 111 of the identifier in the interface 110. In some implementations, the confirmation message 150 can also include an automated-voice notification that the activation has been complete. Alternatively, the confirmation can be sent to other contact endpoints provided by the mobile device, such as an email address, a fax number, or SMS address, or to the virtual PBX services application running on the mobile device. In some implementations, once the virtual PBX services application receives a confirmation from the server that the service is activated successfully, the application can present a summary page or confirmation to the user in an interface on the mobile device.

In the example shown, the services manager 130 can include one or more of the following: a provisioning manager 132, an activation manager 134, and a test/validation manager 136. Provisioning manager 132 can operate to configure configuration data 144 to provide a subset of virtual PBX services in association with, for example, the user account 142. While the user account 142 can include data representing user identification information (e.g., user IDs 118a and 118b), the user account 142 also can include data representing identifier 155, and/or data representing an association between the user identification information and data representing identifier 155. In some implementations, the provisioning manager 132 can operate to configure configuration data 144 prior to receiving a request to provision a set of default services. In some implementations, the provisioning manager 132 can operate to configure configuration data 144 after receiving the request.

To provision telecommunications services once a request has been made, the provisioning manager 132 can determine either a user ID 118c or an identifier 155, or both, and form an association 143 with which to activate (or subsequent access) the virtual PBX services. In some instances, provisioning manager 132 can determine both user ID 118c and an identifier 155, and configure user account 142 to include them. For example, the user ID 118c can be received as the user ID 118a via the interface 110. In some implementations, the identifier 155 can be selected when the user selects representation 111 of an identifier from a pool of identifiers. The provisioning manager 132 can determine the selected identifier and store the selected identifier in the user account 142, and can remove the selected identifier from the pool of available identifiers so that it can no longer be provisioned. In some implementations, the identifier 155 can be generated without feedback from the user (e.g., as a pre-determined identifier that can be pre-selected or randomly determined), with the provisioning manager 132 storing the pre-determined identifier in the user account 142 as the identifier 255. In this case, either the ID 118a or the ID 118b can be sufficient for provisioning, configuring, and activating telecommunications services such that the user need not enter a selection for an identifier or other information.

The activation manager 134 can be configured to activate the user account 142 once the user account 142 has been provisioned with configuration data defining a subset of virtual PBX services. The identifier 155 can be used to access the activated subset of virtual PBX services. For example, where the identifier 155 is a telephone number, then the telephone number can be a main line that can provide access to the virtual PBX services. For example, where the identifier 155 is a telephone number, then the telephone number can be a main line that can provide access to the telecommunications services defined by, for example, the user account 142. In some implementations, the test/validation manager 136 can optionally be used to validate successful provisioning and activation of the subset of virtual PBX services. For example, to validate a telephone number provided as user ID 118a, the test/validation manager 136 can be configured to make a call to the telephone number associated with phone 160. As another example, the user ID 118a can be an email address where the test/validation manager 136 can be used to send an email massage to the email address to validate that the email address can be implemented as an extension.

In some implementations, a single submission of data (e.g., user ID 118a) to the TSP system 120 can enable the user to acquire an account to use the virtual PBX services. In some implementations, the user need not provide other data (e.g., contracting, billing, configuration, or other information) to activate the subset of virtual PBX services. Once user account 142 is activated, the telecommunications services can be used. That is, the user can start using the primary identification number (e.g., a toll-free telephone number) associated with the virtual PBX services as a common contact identifier 155 (or address) nearly instantaneously, so that third parties can immediately access the associated virtual PBX services (e.g., the user's customers can contact the user at an extension linked to the identifier 155). For example, if the virtual PBX services include a call-forwarding service, a call made to a specified toll-free telephone number (e.g., the identifier 155) can be forwarded to a telephone number, such as user ID 118a.

Examples of the interface 110 can include physical interfaces (e.g., a display on a mobile device) and virtual interfaces (e.g., a web page, panel, window, display, palette, tab, screen, or the like in an application program running on the mobile device). In some implementations, the user can provide additional data in a single submission to request activation of telecommunications services. Further, the TSP system 120 can include one or more servers, software applications, application programmable interfaces (APIs), logic (e.g., software or electrical/hardware logic), or any combination thereof. For example, the service manager 130 can include provisioning manager 132, an activation manager 134, a test/validation manager 136, and other components, such as a configuration manager (not shown), any of which can be implemented in hardware, software, or any combination thereof.

In some implementations, the telecommunications services can be associated with configuration data that represents any combination of virtual PBX services, such as services selected from the group of call forwarding, call routing, facsimile, email, text messaging, voice messaging (e.g., voice mail), extension support, private branch exchange, and the like. A default configuration for the virtual PBX services can be stored in the repository 140 as, for example, the configuration data 144.

In some implementations, the term "single submission," such as single submission of data, can refer to sending, providing, or transmitting sufficient data to activate or request telecommunications services from an interface without requiring an interface transition to provide additional data to request the same telecommunications services. An example single submission of data can be clicking a button on a graphical user interface (e.g., "submit", "send", or "activate" buttons, or the like) on a mobile device.

In some implementations, "provisioning" can refer to providing capabilities for telecommunications services (e.g., virtual PBX services) to the user or customer account, including transmission of voice, data, or both to a telephone number, facsimile number, email address, voicemail address, the like, or any combination thereof. This can include providing for the hardware, software, storage, processing power, administrative requirements and the like necessary for supporting the services for a given account. The account can be a placeholder account not currently activated or associated with a particular user.

In some implementations, "configuring" can refer to modifying data for a user account to configure one or more virtual PBX services. In some implementations, the term "activating," can refer to enabling a user account and its data (e.g., configuration data) to provide virtual PBX services. In some implementations, the foregoing system, components, elements, and processes can be varied in number, structure, function, configuration, implementation, or other aspects and are not limited to those shown and described.

To illustrate the operation of TSP system 120, the following example is provided. However, it should be understood that the example is non-limiting and that the virtual PBX service provider system 100 can be applied in various applications. Initially, a request for activation can be handled by the provisioning manager 132, for example, by creating and storing a user account 142 in the repository 140. The user account 142 can include a binding of a cellular telephone network (CTN) (e.g., 1-650-555-9876) to a timeslot interchange device (e.g., 1-888-555-1200), which in turn can be associated by an association 143 with virtual PBX services that can be defined by the configuration data 144. The configuration data 144 can be used to configure the virtual PBX services including different types of services (e.g., call extensions, facsimile, email, voicemail, and the like), and number of services in each type (e.g., four call extensions, an email box, and a facsimile), any combination of services types, and/or one or more rules to, for example, govern how services are rendered (e.g., for extension 1, if a call is not answered by the third ring, send the caller to a voicemail box). The configuration manager 133 can be used to create the configuration data 144. In some implementations, the configuration data 144 can be pre-defined (i.e., defined before a user initiates an activation request). The configuration manager 133 can also be used or add, remove, or modify the virtual PBX services after the virtual PBX services have been initially activated. Additional databases can be used to store automatic number identification (ANI) data, calling name (CNAM) data, dialed number identification service (DNIS) data, or any other data or combination thereof. These additional databases can be accessed by the provisioning manager 132, the configuration manager 133, the activation manager 134, or other system components to access or look up additional data associated with a CTN. For example, the name of a caller can be looked up using a telephone number (e.g., a CTN). Other call data (e.g., caller ID or ANI data) can be determined using a telephone number (e.g., a CTN).

In some implementations, after a placeholder account is provisioned and configured (e.g., configured in accordance with default configuration data), the placeholder account and the virtual PBX services associated with the placeholder account can be activated. To activate the placeholder account, the activation manager 134 can, for example, mark an "activated" flag or field in the placeholder account, or in the configuration data 144 thereof, to indicate that the placeholder account and its services have been associated with a user and have been activated. In some implementations, activating an account (e.g., associating a placeholder account with a user ID) can be done in real-time or instantaneously, at least as perceived by the user. By pre-provisioning one or more placeholder accounts before the user requests for activation are received, the TSP system 120 can have a set of pre-provisioned accounts available. When the user request is received, the association between a pre-provisioned account and the user can be accomplished without hardware and/or personnel delays. The association between the placeholder account and a user ID can be fully automated, and can be accomplished within seconds as opposed to days or weeks as required by conventional provisioning and activation techniques. In some implementations, physical resources necessary for account setup and configuration can be pre-provisioned, and an account can be configured and activated by associating the different resources with a user ID. Because the major bottlenecks in account setup in conventional techniques have been eliminated before a user request is received, the account activation can be effectively instantaneous to the user making the request.

In some implementations, the test/validation manager 136 can be used to test or validate a CTN or to confirm activation. For example, to test activation, the test/validation manager 136 can interact with a communications interface (e.g., a call handler) to call a TSI associated with the CTN, which, in turn can cause the TSP system 120 to generate a call to the CTN after a successful activation. The communication interface can detect whether the TSI is associated with virtual PBX services provided by the TSP system 120. If so, the TSP system 120 can look up the associated CTN in database 140, retrieve information relevant to user account 142, and route the call to the CTN, which is received at telephone 160 or a mobile device sending the activation request. Caller data, such as caller-ID data, or the TSI can be sent to the telephone 160 or the mobile device sending the activation request. Alternative designs for the telecommunications service provider system are also possible.

The TSP system 120 can include any number and any combination of the following: web server, databases, media server, call handler, and service manager server. In some implementations, the TSP system 102 can include an additional server for handling requests from a virtual PBX services application running on a mobile device. This additional server can be implemented as part of the web server, or a standalone server.

Mobile Device Implementation

Figure 2:
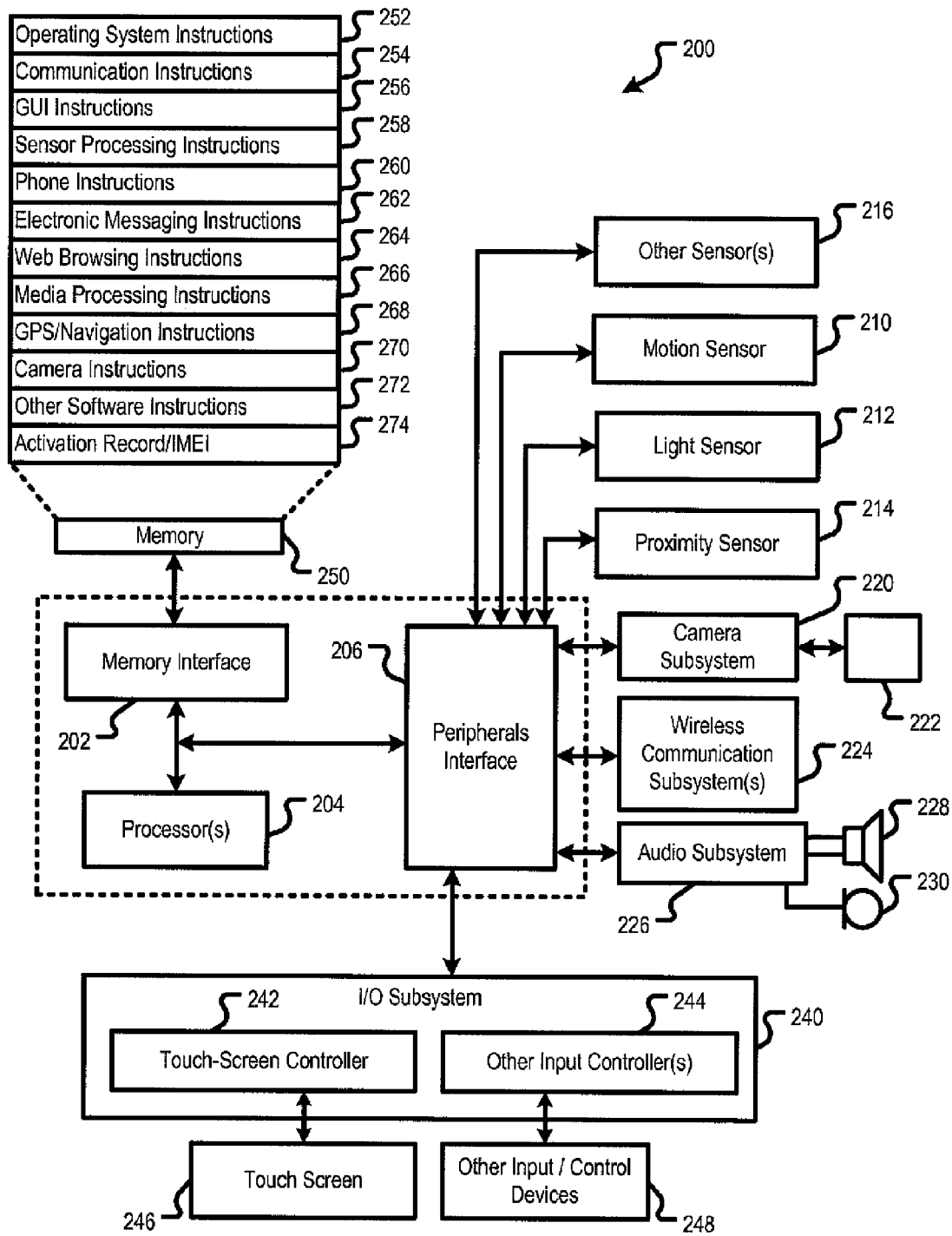
FIG. 2 shows an example of a mobile device.

FIG. 2 shows an example of a mobile device 200. The mobile device 200 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222 (e.g., a charged coupled device ("CCD") or a complementary metal-oxide semiconductor ("CMOS") optical sensor) can be utilized to facilitate camera functions, such as recording photographs and video clips.

Communication functions of the mobile device 200 can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device is intended to operate. For example, a mobile device can include communication subsystems 224 designed to operate over a GSM network, a GPRS network, an EDGE network, a Wi-Fi or WiMax network, and a Bluetooth™ network. In particular, the wireless communication subsystems 224 can include hosting protocols such that the mobile device can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as, without limitation, one or more buttons, rocker switches, thumb-wheel, infrared port, USB port, and/or a pointer device such as a stylus. The one or more buttons (not shown) can include an up/down button for volume control of the speaker 228 and/or the microphone 230. The touch screen 246 also can be used to implement virtual or soft buttons and/or a keyboard.

The memory interface 202 can be coupled to the memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as, without limitation, Darwin, RTXC, LINUX, UNIX, OS X, WINDOWS, or an embedded operating system such as VxWorks. The operating system 252 can include instructions for handling basic system services and for performing hardware dependent tasks. In some implementations, the operating system 252 can be a kernel (e.g., UNIX kernel). If the service provider permits porting out line numbers, the service provider can require an authorization form.

The memory 250 can also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions.

Each of the above identified instructions and applications can correspond to a set of instructions for performing one or more functions described above. These instructions need not be implemented as separate software programs, procedures, or modules. The memory 250 also can include additional instructions or fewer instructions. Furthermore, various functions of the mobile device 200 can be implemented in hardware and/or in software, including in one or more signal processing and/or application specific integrated circuits.

Example User Interface for Call Handling Management

Figure 3A:
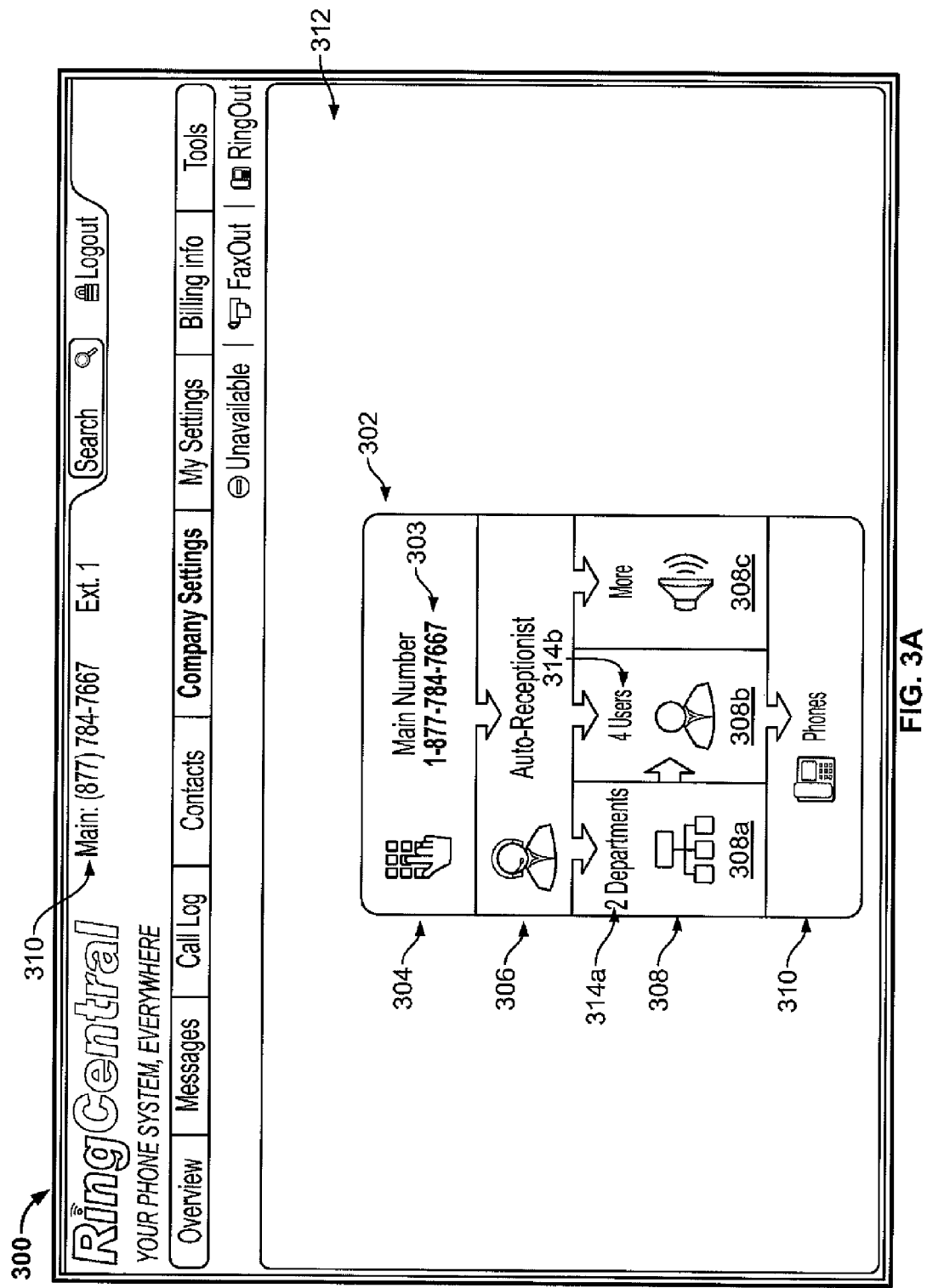
FIG. 3A show an example of an initial user interface presented on a device.

FIGS. 3A-3N shows examples of various user interfaces that can be used to configure/manage virtual PBX services. In some implementations, the user interfaces can be generated by the interface manager 135, and can be used to configure virtual PBX services for a single line. A single-line virtual service can provide, for example, a main number, and calls made to the main number can be managed according to one or more sets of call handling rules that can be configured through the user interfaces. In some implementations, such call handling rules can include, but are not limited to, forwarding numbers/rules, call screening rules, voicemail rules, ring-out rules, and rules pertaining to other PBX functions and the like. A user or an administrator can access the user interfaces using, for example, a web browser available on a mobile device or personal computing platform, and access the corresponding account through the user interfaces after successful authentication.

In some implementations, the user interfaces shown in FIGS. 3A-3N can be accessed only after a user or administrator has setup and activated the virtual PBX services. The user or administrator can set up a main service telephone number ("main number") that identifies the user to the outside callers and at the TSP server end. The services activated can include a subset of pre-provisioned and pre-configured virtual PBX services, optionally customized based on information provided during the activation by the user. For example, a pre-provisioned service can include call forwarding to the contact number provided by the user or to multiple numbers according to call forwarding rules set by the user during activation. After setup and authentication, the user interfaces (e.g., user interface shown in FIG. 3I) can be used to modify the call forwarding rules.

In some implementations, multiple concurrent sessions also can be executed using the same interfaces. For example, multiple extension users from the same single-line can access and configure the individual extension profile concurrently. Any changes made to the individual extension profile can be reflected immediately in the virtual PBX service provider system 100 that allows real-time update to the extension user profiles across the system.

In some implementations, the user interfaces shown in FIGS. 3A-3N also can be used in a multi-extension environment. In setting up the multi-extension virtual PBX services, multiple users can share a same main number, and an outside caller can choose which branch or extension to call by identifying the branch, extension name or extension number. Users of each extension can have an individualized set of pre-provisioned and pre-configured virtual PBX services, optionally customized by themselves or by the user activating the service account.

FIG. 3A shows an example of an initial interface 302. The initial interface 302 can be accessible as a webpage at a particular URL. In some implementations, the initial interface 302 can be presented to the user or administrator upon successful authentication.

As shown, the initial interface 302 can be presented on a backplane 312. In some implementations, the backplane 312 can be executed by the configuration manager 133 to execute or to keep track of all the configuration parameters associated with initiating various applications, and which has various capabilities to start, stop, and provide links to any one of the applications. The backplane 312 can be implemented using, for example, a Java applet and can be launched along with the initial interface 302 through the browser 300 after successful authentication.

In some implementations, the administrator can log into an existing account (e.g., account 142) and enter an identifier (e.g., identifier 155), and corresponding authentication password. Optionally, the administrator also can enter an extension number associated with the identifier 155 to access the account. Additional fields of personal information also can be required. For example, the administrator can be queried to enter a first name or last name.

The initial interface 302 can display one or more user interface elements 304, 306, 308 and 310 that are user-selectable. Each user interface element 304-310 can be associated with an application that can be invoked by a user input selecting the corresponding user interface element 304-310 with an input device. Each application can enable the administrator to interact with one or more web-based virtual PBX services or functions, as will be discussed in greater detail below.

As shown in FIG. 3A, the initial interface 302 can include a main number interface element 304, an auto-receptionist interface element 306, an entity interface element 308, and a phone interface element 310. The main number interface element 304 can be used to indicate an identifier 303 entered during login (e.g., identifier 155). In some implementations, the identifier 303 also can be displayed on the browser 300 to provide easy notification to the administrator as to the account being accessed. For example, the identifier 303 can be displayed at the top of the browser 300. In some implementations, the main number interface element 304 also can display a fax number or an email address. The email address can be linked to the identifier 303 that is subscribed to, for example, voice to email services, facsimile to email services, or other services using that email address.

The auto-receptionist interface element 306, when activated, can auto-manage all of the virtual PBX services on behalf of the extension user. For example, when activated, the auto-receptionist can play a computer-generated greeting to callers of all incoming calls. The administrator also can select one of the personal greetings stored in a database (e.g., database 136), and configure the auto-receptionist to play the selected personal greeting instead of the computer-generated greeting.

The administrator can also configure the auto-receptionist to associate the personal greeting that can be played upon receiving a caller selection of an extension with that extension. For example, a caller may verbally request the auto-receptionist to connect to extension user "Jane Doe". In response to the verbal request, the auto-receptionist can play the personal greeting previously recorded for extension user "Jane Doe". As another example, a caller may input extension "105" upon reaching the main number. In response, the auto-receptionist can identify extension "105" as being associated with extension user "Jane Doe", and play the personal greeting for extension user "Jane Doe" to the caller.

Existing extensions associated with the identifier 303 can be displayed through the entity interface element 308. In some implementations, the extensions can be categorized. To categorize the existing extensions, the administrator can pre-define one or more categories. Once the one or more categories have been defined, the defined categories can be displayed through the entity interface element 308. As an example, the administrator can define a "Users" category, and information pertaining to extensions users can be accessed using the "Users" interface element 308b. Similarly, the administrator can define a "Department" category, and similar to the "Users" category, extensions categorized as department extensions can be accessed through the "Department" interface element 308a.

Alternatively, the initial interface 302 can be configured to automatically recognize the types of contact (e.g., a department or a user) based on, for example, the length of an extension number without requiring the administrator to pre-define a category to identify the type of associated extensions. As an example, extension assigned with a three-digit extension (e.g., ext "101") can be assigned to the "Users" group while extensions assigned with an one-digit extension (e.g., ext "1") can be assigned to the "Department" group. In some implementations, the initial interface 302 can automatically be configured to classify each extension based on the length of the extension so that extensions with a particular length (e.g., extensions with three digits) can be automatically grouped.

In some implementations, each interface element 308a/308b can display a total number of extensions assigned to that category/group. For example, the Department" interface element 308a can display "2 Departments" to indicate a total 314a of two departments that have been assigned with an extension. As another example, the "Users" interface element 308b can display "4 Users" to indicate a total 314b of four users who have been assigned with an extension.

Figure 3B:
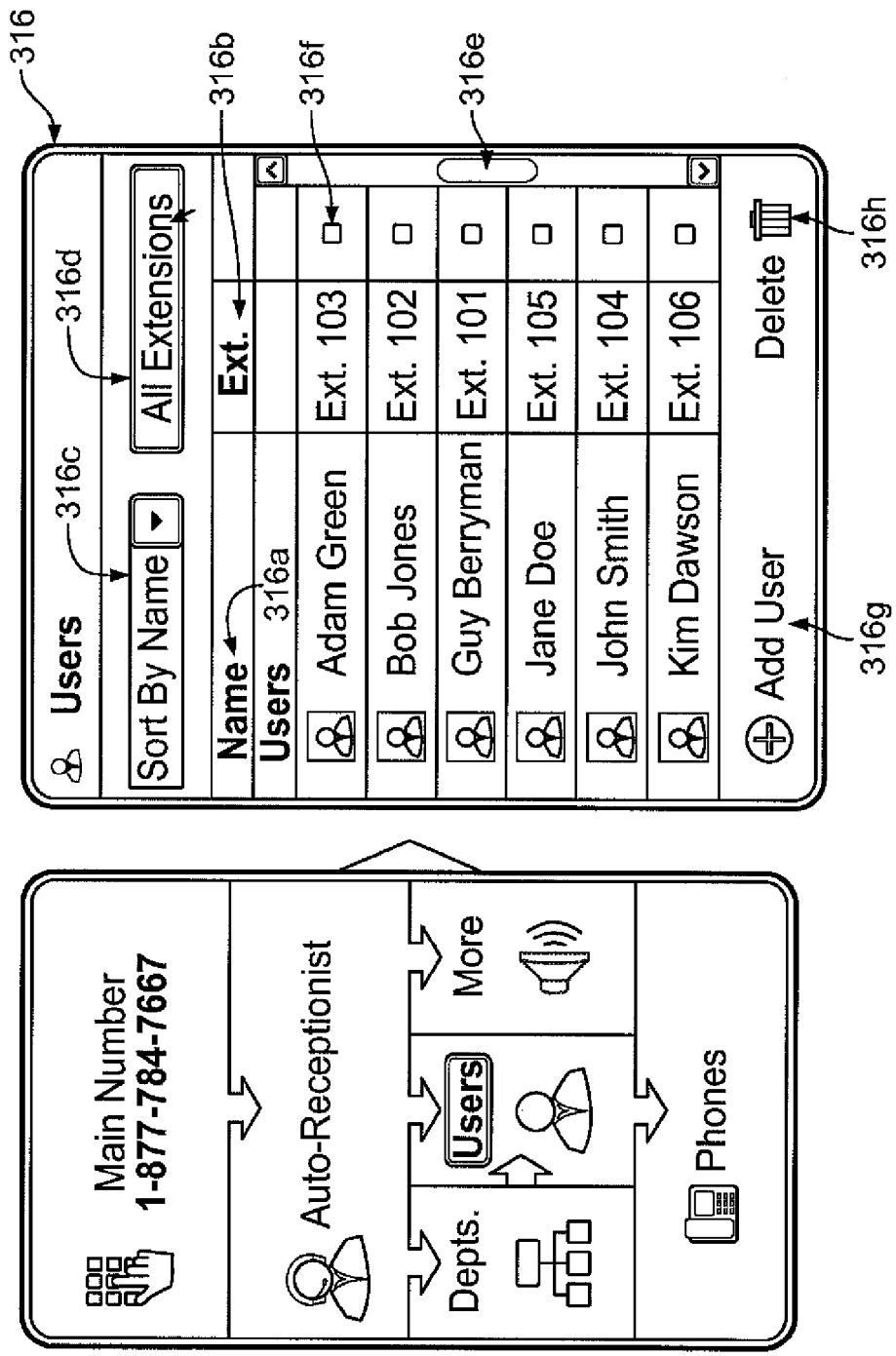
FIG. 3B shows an example of a user interface that can be invoked upon receiving a user selection of a user interface element in the initial user interface.

FIG. 3B shows an example of a user interface 316 that can be invoked upon receiving a user selection of the "Users" interface element 308b. As shown in FIG. 3B, the interface 316 can display a name column 316a listing one or more extension users and an extension column 316b listing one or more extension numbers corresponding to the extension users shown in the name column 316a. In some implementations, only a subset of the extension users are displayed in the interface 316. To view additional existing extension users, the administrator can select the "All Extensions" button 316d to reveal additional extensions or extension users.

All of the information described above can be presented in a single user interface screen. In some implementations, if the screen is not sufficiently large to display all of the extension information, a scrollable interface can be presented, and the administrator can scroll through the screen to view all the necessary information. For example, the interface 316 can be a scrollable interface with a scroll 316e that allows the administrator to capability to scroll through all of the extension users and extensions.

In some implementations, after selecting the "All Extensions" button 316d, the text of the "All Extensions" button 316d can be changed to "Collapse" to indicate to the administrator that the name column 316a and the extension column 316b can be collapsed to reduce the number of extension users that can be viewed at once.

It should be noted that while the interface 316 shows an extension user that is linked to a single extension, any of the extension users can be associated with more than one extensions, and each extension can be associated with a same or different extension device. For example, as shown, extension user "Jane Doe" can be associated with extension "105" and another extension (e.g., extension 109). In this example, extension user "Jane Doe" also can associate extension "105" with one or more extension devices (e.g., a mobile phone and a "Home" phone). Similarly, extension user "Jane Doe" also can associate the second extension (e.g., extension 109) with one or more extension devices (e.g., an "Office" phone and a mobile phone).

In some implementations, the extension users can be sorted (e.g., either by name or by extension). For example, to initiate sorting, the administrator can select the button 316c. Upon selecting (e.g., clicking) the button 316c, a drop down menu can be presented with one or more sorting methods that the administrator can select to effectuate the sorting process. In the example shown, the administrator can select to sort the extension users by name, and the sorted names can be displayed (e.g., first-one-last or last-one-first) to the administrator in the interface 316. The extension users also can be sorted by, for example, extension numbers, the most recent time an extension user was called, the most recent time an extension user made a call, e-mail address, mobile phone number, home phone number, work phone number, facsimile number, home address and the like.

If desired, the administrator can add one or more additional extension users to the extension user category using the "Add User" button 316g. Upon selecting (e.g., clicking) the "Add User" button 316g, a separate interface can be displayed that allows one or more new extension users to be added to the "Users" category. Where one or more of the extension users are to be removed from the "Users" category, a specific extension user can be selected using a selection field 316f (e.g., in the form of a checkbox), and deleted by selecting the "Delete" icon 316h to effectuate the permanent removal of the selected extension user from the "Users" category.

Figure 3C:
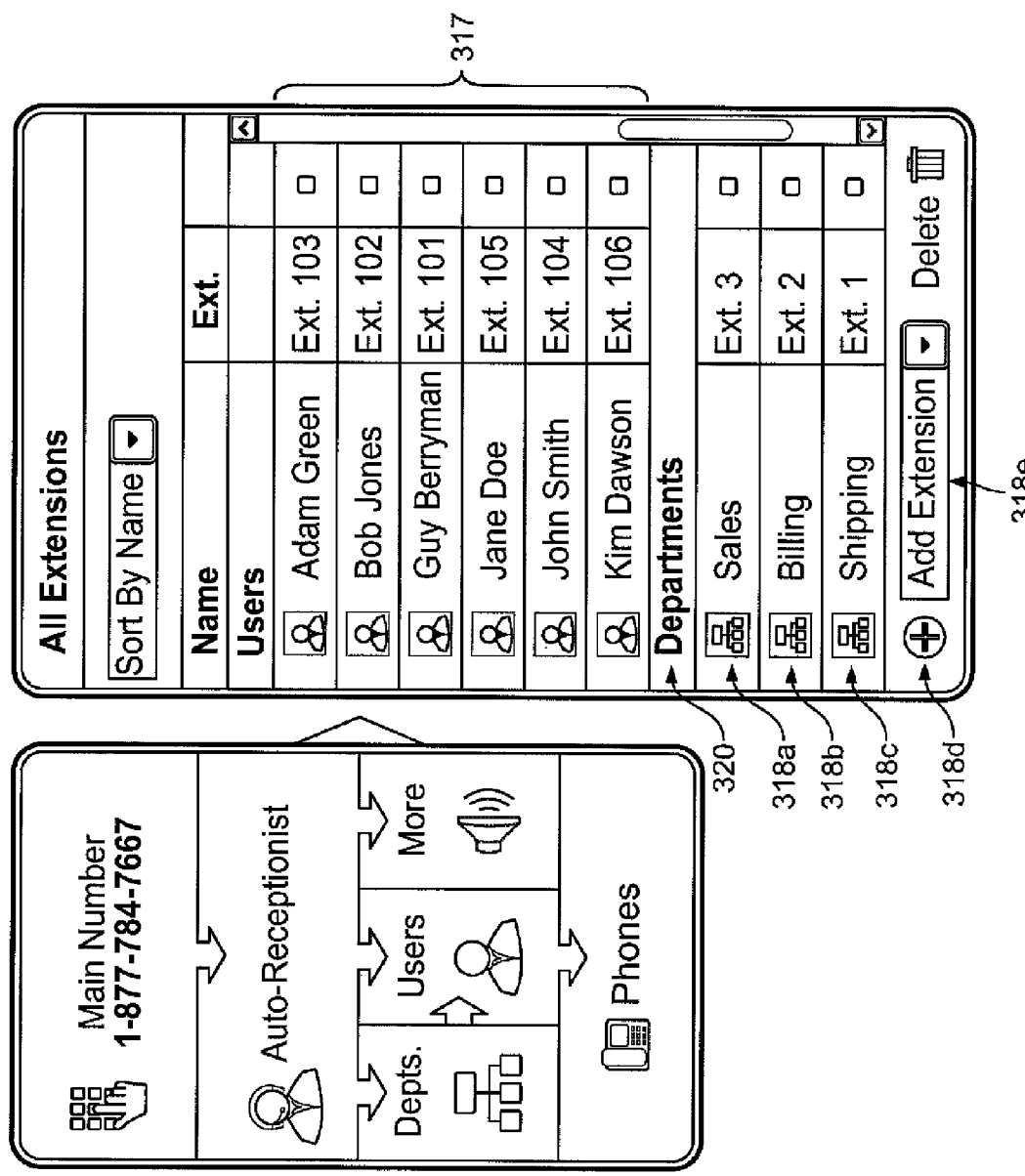
FIG. 3C shows an example of a set of department extensions that can be displayed with user extensions.

As discussed above, a "Department" category can be defined that includes one or more department extensions, and the one or more department extensions can be accessed through the "Department" interface element 308a. In some implementations, one or more department extensions can be displayed together with the user extensions to permit convenient viewing. FIG. 3C shows an example of a set of department extensions that can be displayed together with the user extensions.

Referring to FIG. 3C, the department extensions 318a (e.g., which is assigned to a "Sales" department), 318b (e.g., which is assigned to a "Billing" department) and 318c (e.g., which is assigned to a "Shipping" department) can be displayed below the user extensions 317. To permit convenient identification and recognition between the department extensions 318a-318c and the user extensions 317, a display element 320 can be implemented to visually separate out the user extensions 317 from the department extensions 318a-318c.

Similar to the function provided by the "Add User" button 316g, an "Add Extension" button 318e also can be presented that allows one or more department extensions to be added to the "Department" category. For example, the plusbox 318a or the drop down menu 318e can be activated to add one or more new department extensions to the existing department extensions.

While the department extensions 318a-318c are displayed together with the user extensions 317, a separate interface also can be populated (e.g., a separate interface different from the interface 316) upon selection of the "Department" interface element 308a that allows the department extensions 318a-318c to be separately presented. Where a separate interface is populated for the department extensions 318a-318c, this separate interface can also include, for example, features and tools (e.g., buttons and columns) similar to those shown in FIG. 3B.

Figure 3D:
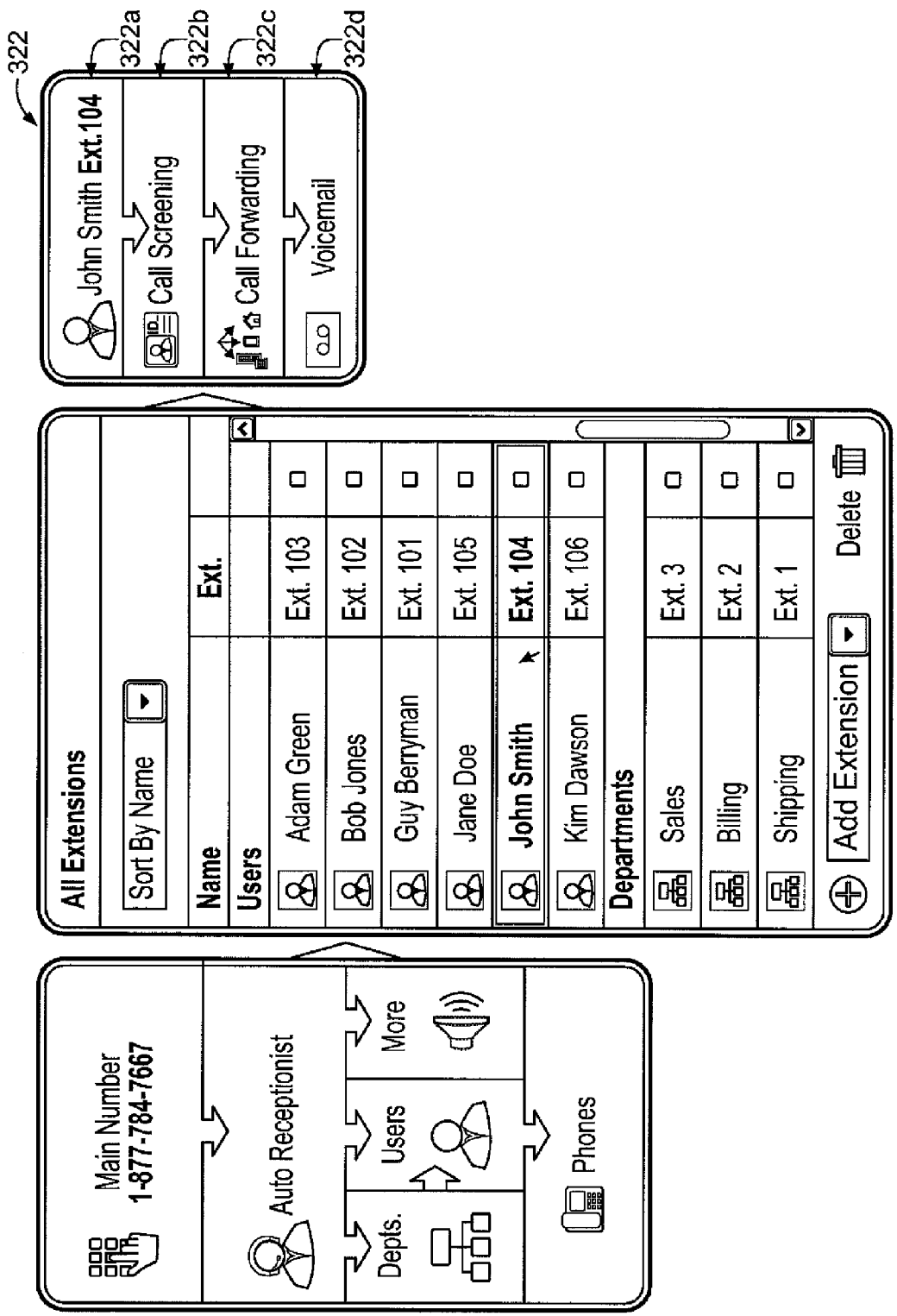
FIG. 3D shows an example of an extension user interface for configuring one or more extension rules associated with an extension.

When a specific extension user is selected, in some implementations, a PBX profile associated with the selected extension user can be displayed through an extension user interface. For example, extension user "John Smith" at extension "104" can be selected from the interface 316 to retrieve the profile and configuration data associated with extension user "John Smith", and the retrieved profile and configuration data can be displayed using the extension user interface. FIG. 3D shows an example of an extension user interface 322 for configuring one or more extension rules associated with an extension.

Figure 3E:
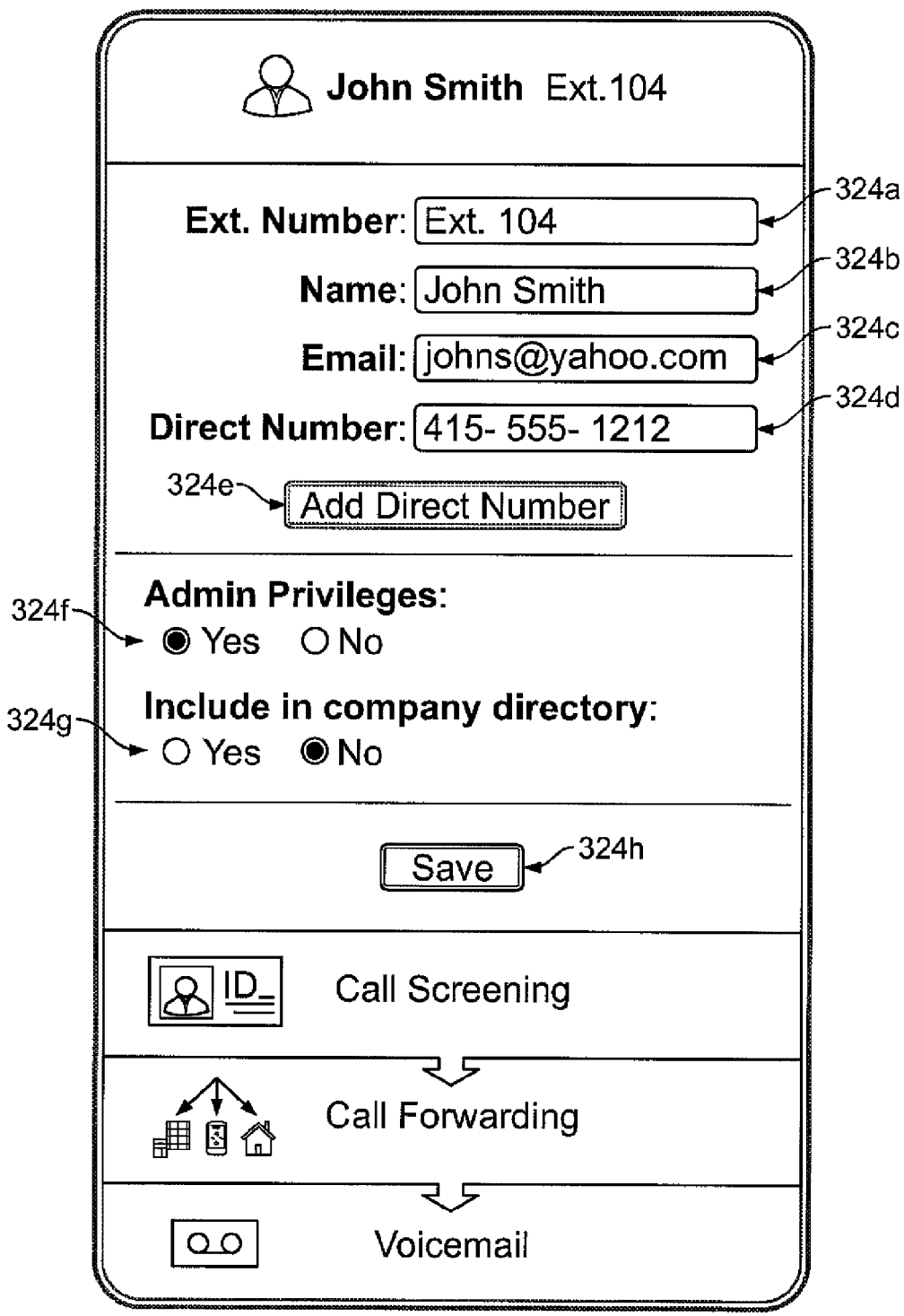
FIG. 3E shows an extension interface element in an expanded state.

Referring to FIG. 3D, the extension user interface 322 can display one or more selectable interface elements 322a-322d through which profile and configuration data for extension user "John Smith" can be accessed. In some implementations, each selectable interface elements 322a-322d can be expandable and collapsible. For example, the administrator can select the interface element 322a to allow one or more fields associated with user account data for extension user "John Smith" to be displayed immediately below the extension interface element 322a. FIG. 3E shows the extension interface element 322a in an expanded state that reveals an example of one or more extension rules for the extension user "John Smith".

In some implementations, parameters for the extension rules associated with extension user "John Smith" can be automatically populated for extension "104" once the extension interface element 322a has been selected. For example, the name and the contact information for extension user "John Smith" can be automatically retrieved (e.g., from repository 146) and displayed in all of the fields 324a-324d. In some implementations, these fields 324a-324d are editable.

In some implementations, a new or different extension can be assigned to extension user "John Smith" by modifying the extension number in the extension number field 324a. For example, changing the extension number "Ext. 104" in the extension number field 324a to a new extension "Ext. 111" would connect incoming calls to extension user "John Smith" upon receiving a caller selection of the extension number "111".

To facilitate the identification of an extension, an extension name field 324b through which an extension name by which a caller can refer to the extension also can be provided. For example, the extension name for the extension number "Ext. 104" can be the name of the extension user "John Smith", and when a caller wishes to be connected to "John Smith" after being presented the option, the call can be routed to the extension number "104".

In some implementations, a direct number for extension user "John Smith" can be presented in the direct number field 324d. The direct number can be used in place of the extension to directly connect to extension user "John Smith". For example, an incoming call can dial "415-555-1212" to connect to extension user "John Smith" at extension "104". If desired, more than one direct number can be specified for extension user "John Smith". For example, a second direct number "415-555-1111" can be defined for extension user "John Smith" that allows callers to be directly connected to extension user "John Smith" at extension "104" by dialing "415-555-1111".

If more than one direct number is added, configuration data can include one or more rules to select a direct number for use with the extension "104" in different situations. For example, the direct number presented in the direct number field 324d can be used as the primary direct number, and any additional direct numbers can be used as alternate numbers if the primary direct number is in use or otherwise unavailable. In some implementations, the direct number presented in the direct number field 324d can be a toll-free number. Where more than one direct number is added, a combination of toll-free numbers and local numbers can be used.

The extension user interface 322 also can present an administrative privileges field 324f that allows administrate privileges to be assigned to extension user "John Smith". Where the extension user is given administrative privileges, in some implementations, the extension user can access and modify profiles and configuration data associated with other extension users associated with the main number.

A company directory field 324g also can be presented to the administrator in the interface 322. Using the company directory field 324g, extension user "John Smith" can be placed in the company directory, or alternatively removed from the company directory as required. At the completion of changes made to the fields 324a-324g, the administrator can press the button 324h (e.g., the "Save" button on the interface 322) to save all the changes made in the fields 324a-324g.

Figure 3F:
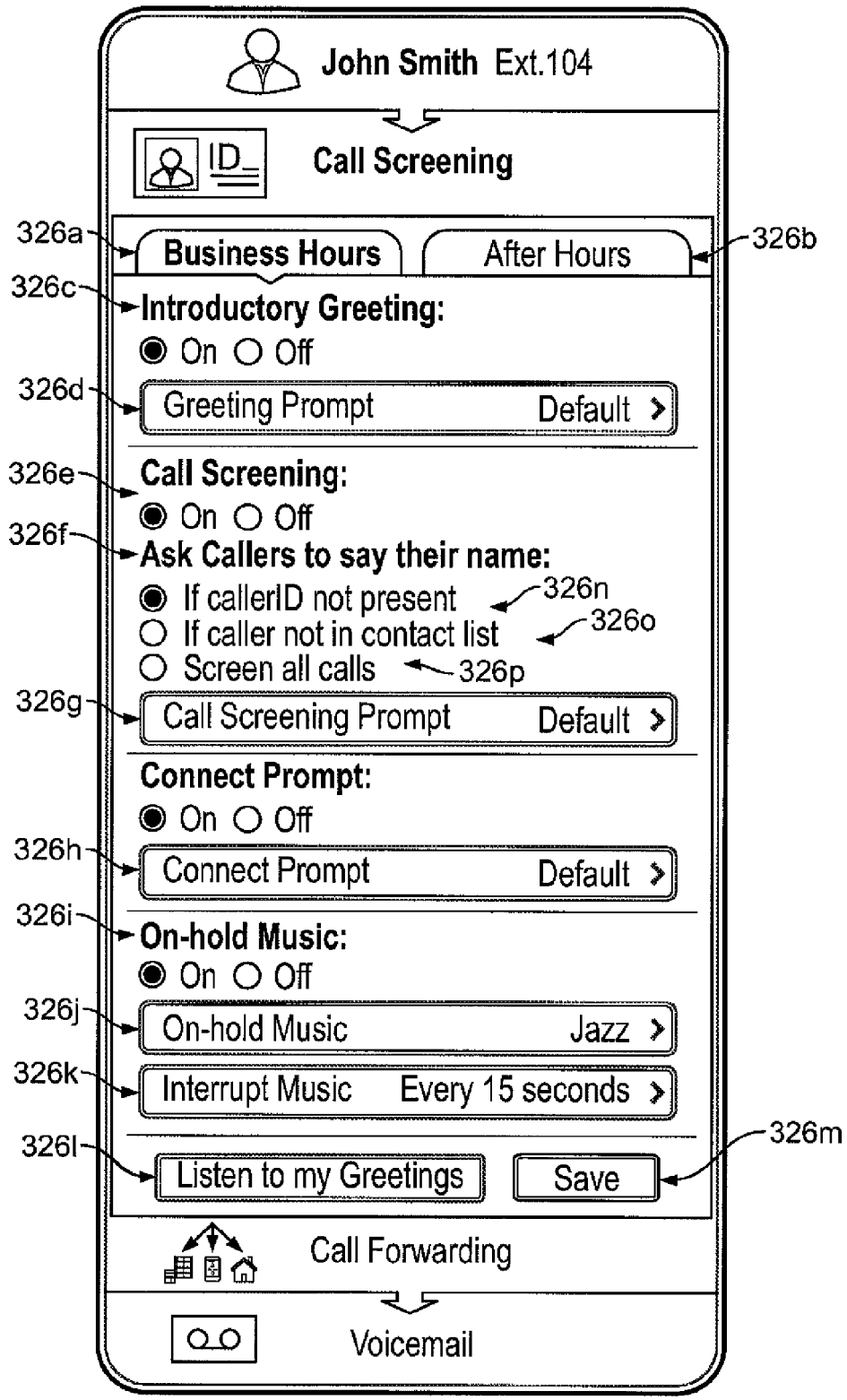
FIG. 3F shows an example of a call screening interface element in an expanded state.

FIG. 3F shows a call screening interface element 322b in an expanded state. In some implementations, upon invoking the call screening interface element 322b, one or more call screening rules associated with virtual PBX call screening can be presented. The one or more call screening rules can be configured to direct incoming calls to one or more designated destinations, depending upon the identity of the callers. For example, the call screening rules can be configured to forward incoming calls with identifiable and recognizable call identification telephone numbers ("caller IDs") directly to the extension user. The call screening rules also can be programmed to automatically forward calls with unrecognizable caller IDs to the voice mailbox of the extension user. The call screening rules further can be configured to forward other incoming calls from calling parties to other extension users, or redirect designated calls to an operator. In some implementations, call screening can be accomplished using a look-up table that cross-references a caller identification number to a pre-defined destination.

As shown in FIG. 3F, in some implementations one or more sets of call screening rules can be configured. For example, one set of screening rules associated with calls made during business hours can be configured by selecting the "Business Hours" tab 326a, and another set of call screening rules associated with calls made after business hours can be configured by selecting the "After Hours" tab 326b. One of ordinary skill in the art would readily recognize that the call screening rules associated with "Business Hours" and "After Hours" are exemplary and non-limiting, and that other custom call handling configuration also can be provided. For example, the extension user or the administrator can configure a new tab associated with a particular schedule that begins and ends at a predefined hour of the day.

In some implementations, the call screening rules for calls made after business hours can be linked to the privacy hours of the extension user that can include a block of hours during which all incoming calls are to be intercepted and forwarded based on the call screening rules. The block of hours can be designated by a start time and an end time, and calls can be intercepted during the block of time beginning with the start time and ending with the end time. This block of time can be strictly adhered by the configuration manager 133 until the start and the end time of the privacy hours have been changed.

Figure 3G:
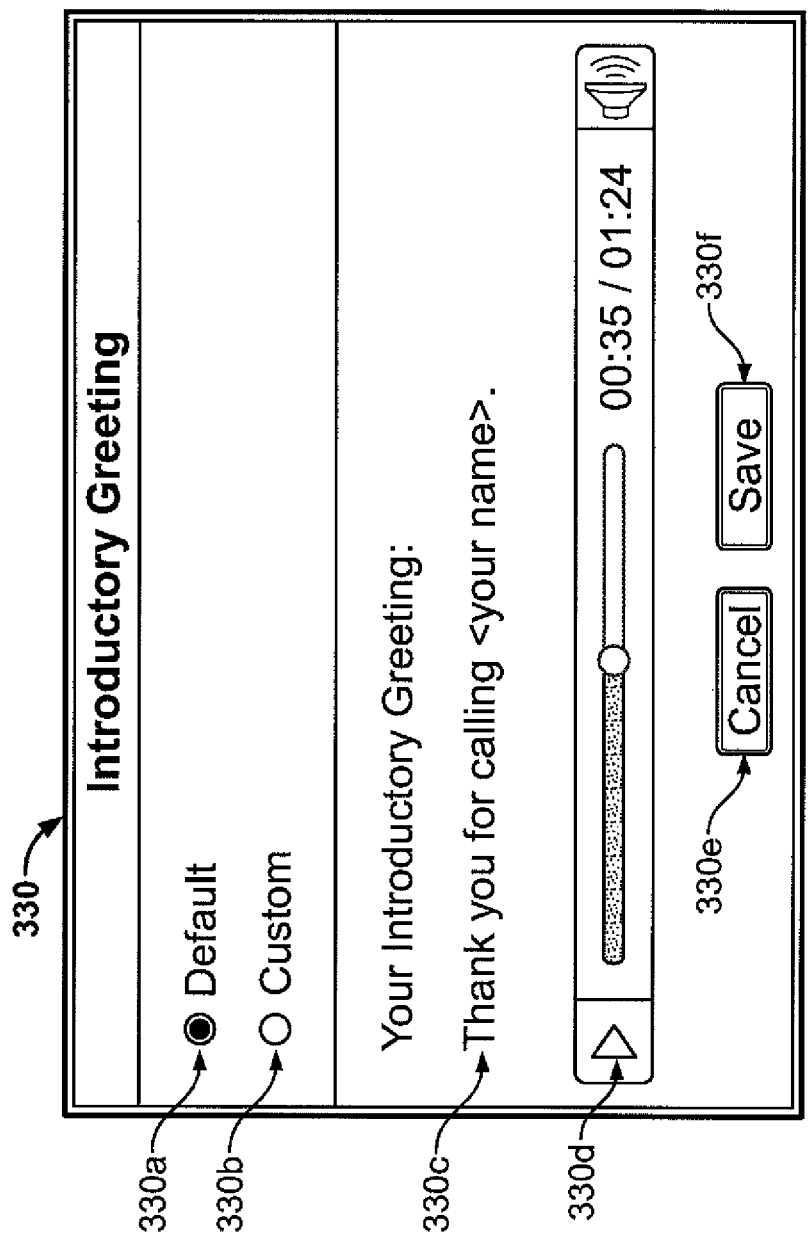
FIG. 3G shows an example of an introductory greeting interface for configuring one or more greeting rules associated with an extension.

The extension user interface 322 can include an introductory greeting field 326c. The introductory greeting field 326c can present an option (e.g., ON/OFF option) for enabling or disabling an introductory greeting played to a caller when the caller places a call to the main number of the virtual PBX services. After the introductory greeting has been played, the caller can then be prompted to enter or select an extension number to which the caller is to be routed based on the existing call handling rules associated with the selected extension.

Where the introductory greeting is enabled, a default greeting or a customized greeting can be selected using the prompt menu 326d. In some implementations, activating the prompt menu 326d invokes an introductory greeting interface that can be used to specify one or more greeting rules. FIG. 3G shows an example of an introductory greeting interface for configuring one or more greeting rules associated with an extension.

Referring to FIG. 3G, the introductory greeting interface 330 can present a default greeting selection 330a. When selected, the default greeting option 330a allows a default message (e.g., a standard computer-generated greeting) that has been pre-selected or pre-programmed to be played at the time of receiving a call from a caller to the main number. In some implementations, the greeting can be tailored to a particular type of practice or business. In some implementations, the introductory greeting interface 330 can present a drop down list of greetings that the administrator/extension owner can select as the default greeting.

In some implementations, a custom greeting can be specified by selecting the "custom" greeting option. In some implementations, a custom greeting can be a voice greeting recorded in advance. In some implementations, a line of text can be entered in the text field 330c for all or portions of a custom greeting, and the line of text can be converted into voice recording (e.g., with the assistance of text-to-speech software) that can be played to the caller. For example, a line of text can state "Thank you for calling John Smith" that can be converted into voice recording such that upon connecting a caller to extension user "John Smith", the greeting "Thank you for calling John Smith" can be played to the caller.

In some implementations, the introductory greeting interface 330 can include a button 330d for playing or previewing all the greetings available or recorded before finalizing the selection. The selected greeting can be played when a call is connected to the main number, when the call is connected to the extension "104", or when the call is transferred to a forwarding number associated with the extension "104". The administrator can cancel (e.g., using button 330e) or save (e.g., using button 330f) any changes made to the greeting rules in the interface 330.

As discussed above, the call screening rules can be configured to forward calls with identifiable call identification telephone numbers directly to an extension user, while forwarding calls with unrecognizable call identification telephone numbers to the voice mailbox of the extension user. In some implementations, a caller identification feature can be used for identifying the telephone number from which the incoming call originates. Alternatively, the administrator can require each caller to identify the name of the caller before the incoming call can be forwarded.

Referring back to FIG. 3F, the extension user interface 322 can present a caller name option 326f to facilitate the means by which the identity of a caller is to be specified. For example, a caller with a blocked caller ID would need to specify the name of the caller under the "If callerID not present" option 326n before the call can be connected. In some implementations, blocked calls connected to the main number can be answered on the first ring, and an announcement or greeting can be played to notify the callers that blocked calls are not accepted and can only be connected once the caller has revealed the caller's identity. Other options such as the "If caller not in contact list" 326o and "screen all calls" option 326p also can be provided. For example, upon selecting the "If caller not in contact list" 326o, callers not in a contact list of the extension user would need to specify the names of the callers. As another example, selecting the "screen all calls" option 326p would require all callers, including callers with identifiable caller IDs and callers who are on the contact list of the extension user, to specify the names of the callers before the calls can be connected.

The extension user interface 322 also can include a connect prompt 326h. When the connect prompt 326h is selected, a popup can appear that allows a selection to be performed between a default or custom voice prompt. Where the custom voice prompt is selected, the administrator can be requested to upload or designate an audio file. The popup can include a playback function that allows the audio file to be previewed before storing the uploaded audio file for subsequent use, and the audio file can subsequently be retrieved and played to the caller of an incoming call. Alternatively, the administrator can provide a phone number to which the incoming call can be forwarded and where the custom voice prompt can be played.

In some implementations, the extension user may be pre-occupied when an incoming call is received. For example, the extension user may be on another active line where the incoming call can cause an undesirable disruption. The extension user may wish for the incoming call to be temporarily placed on hold. To do so, the extension can be preset so that an on-hold action can be automatically performed when an incoming call is received. Alternatively, the call screening rules can be configured to allow the extension user to pick up the incoming call and place the incoming call on hold while attending another active call. While the caller is on hold, call screening rules can be configured, for example, to play on-hold music to the caller. The on-hold music can be used to indicate to the caller that the call is still active. To activate (or deactivate) the on-hold music, the extension user interface 322 can present an on-hold music option 326i through which an on-hold music can be enabled or disabled. Enabling the on-hold music can present an additional option (e.g., via the on-hold music prompt 326j) to specify a desired genre associated with the on-hold music that can be played to the caller (e.g., rock, jazz, classical and the like).

The extension user interface 322 also can present a music interruption option 326k for interrupting the on-hold music. In some implementations, the music interruption option 326k allows a predetermined duration period to be set so that the on-hold music can be interrupted based on the predetermined duration period (e.g., by a computer-generated voice recording or personal message to notify that the caller is still on-hold). For example, a duration of fifteen seconds can be set using the music interruption option 326k such that a voice recording can interrupt the on-hold music every fifteen seconds.

The extension user interface 322 can display a playback button 326l for previewing the greeting before finalizing the preset greeting rules, which can subsequently be saved using the "Save" button 326m. The introductory greeting selected can then be played when an incoming call is connected to the main number, when the call is connected to the extension "104", or when the call is transferred to a forwarding number associated with the extension "104".

Figure 3H:
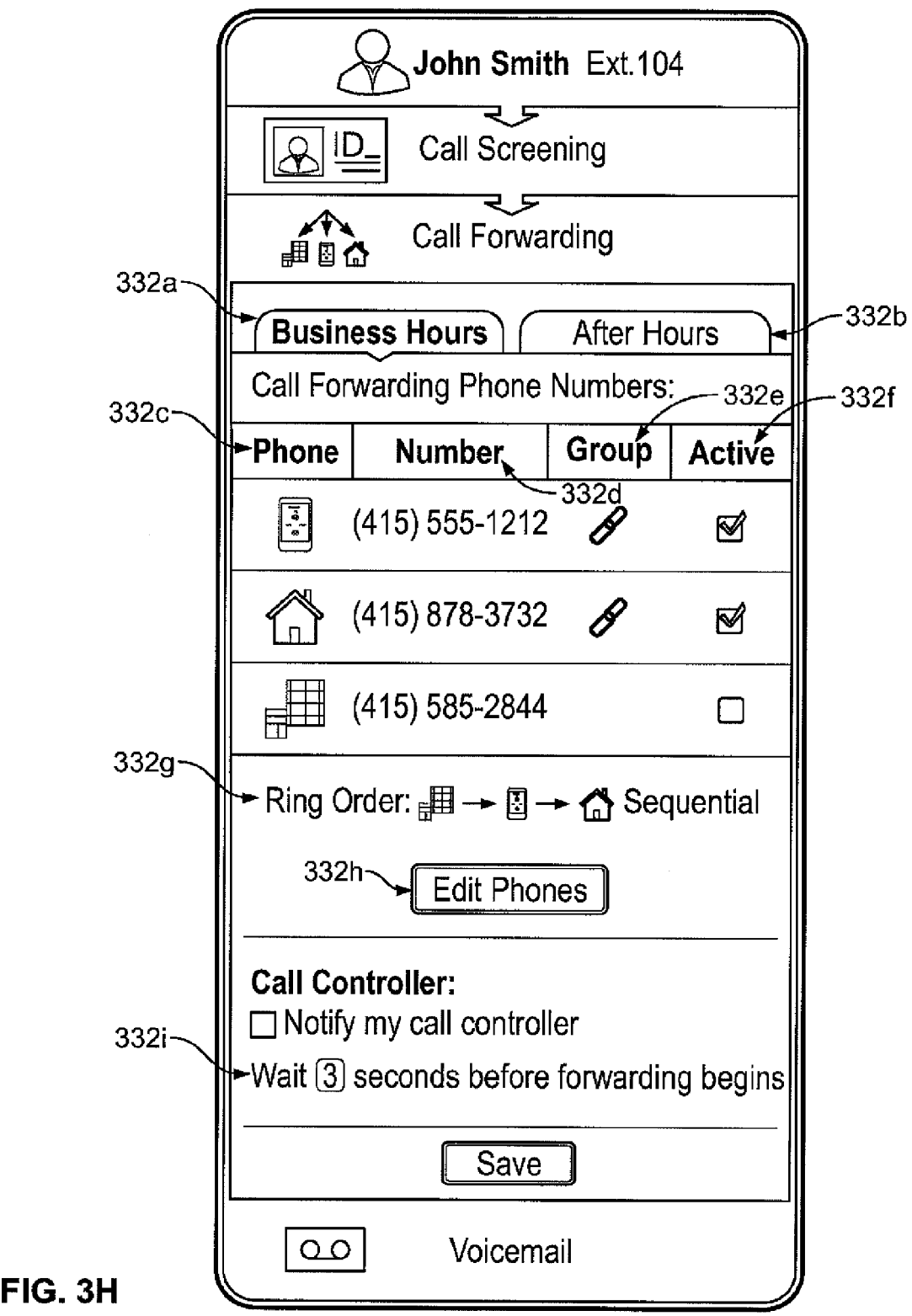
FIG. 3H shows an example of a call forwarding interface element in an expanded state.

FIG. 3H shows a call forwarding interface element 322c in an expanded state. In some implementations, upon activating the call forwarding interface element 322c, one or more call forwarding rules associated with virtual PBX call forwarding can be revealed.

Similar to call screening rules, in some implementations, one or more sets of call forwarding rules can be configured. For example, one set of forwarding rules associated with calls made during business hours can be configured by selecting the "Business Hours" tab 332a, and another set of call forwarding rules associated with calls made after business hours can be configured by selecting the "After Hours" tab 332b.

In some implementations, one or more call forwarding rules can be initiated after a predetermined period. In some implementations, the predetermined period can be defined by the administrator. For example, an entry field 332i can be provided to receive a numeric entry indicating the time (e.g., in seconds) after which the call forwarding rules can be executed. As an example, after receiving an incoming call, the incoming call can be forwarded to a mobile phone of the extension user after three seconds.

As shown in FIG. 3H, one or more existing call forwarding rules indicating an associated call forwarding number and the type of terminal receiving the forwarding call can be summarily presented. To edit an existing call forwarding number, the administrator can select the "Edit Phone" button 332h to invoke an edit forwarding phone number interface. FIG. 3I shows an example of an edit forwarding phone number interface 334 for configuring one or more call forwarding rules associated with an extension.

As shown in FIG. 3I, one or more types of forwarding numbers, such as a forwarding number 334h associated with a "Mobile" device 334e, a forwarding number 334i associated with a "Home" device 334g or another type of forwarding number 334j associated with "Other" type of device(s) 334g can be specified. In some implementations, the forwarding numbers 334h-334j can be manually entered or automatically populated (e.g., the forwarding numbers 334h-334j can be automatically populated based on the information submitted during activation). In some implementations, the information can be extracted from an address book application installed on the extension device. A text prompt also can be displayed to request the forwarding numbers to be specified.

In some implementations, the forwarding numbers 334h-334j defined in the forwarding phone number field 334c can be configured to ring sequentially or simultaneously when a caller calls the main number. For example, the administrator can establish a call forwarding setting to allow devices 334e-334g associated with the call forwarding numbers 334h-334j to ring sequentially (e.g., by selecting the button 334a) based on the orders in which the call forwarding numbers 334h-334j are listed (e.g., call forwarding number 334i can be configured with a higher priority than call forwarding number 334j but with a lower priority than call forwarding number 334h). As another example, a call forwarding setting can be established to allow devices 334e-334g associated with the call forwarding numbers 334h-334j to ring simultaneously (e.g., by selecting the button 334b) so that the devices 334e-334g can be simultaneously rung at the time of receiving an incoming call to the main number or the extension of the extension user. Once the ring order selection has been made, the ring order selection can be displayed (e.g., under field 332g) together with the defined forwarding phone numbers in the selectable call forwarding interface element 322c.

The interface 334 also can include an activate/deactivate field 334k for displaying the active status of a call forwarding rule. In some implementations each call forwarding rule can include an ON/OFF indicator 334l, 334m, and 334n to indicate whether a corresponding forwarding number is enabled or disabled. As an example, the "ON" indicator 334l indicates that the forwarding number 334h is currently active. As another example, the "OFF" indicator 334n indicates that the forwarding number 334j is currently inactive.

In some implementations, advanced settings can be defined for each call forwarding number 334h-334j. To access the advanced settings, an indicator 336a, 336b, and 336c can be displayed for each call forwarding number. The administrator can select an indicator 336a-336c corresponding to the call forwarding number whose settings are to be accessed. Upon selection, an advanced setting interface can be invoked. FIG.

3J shows an example of an advanced setting interface 338 for configuring one or more advanced settings parameters associated with an extension.

Figure 3J:
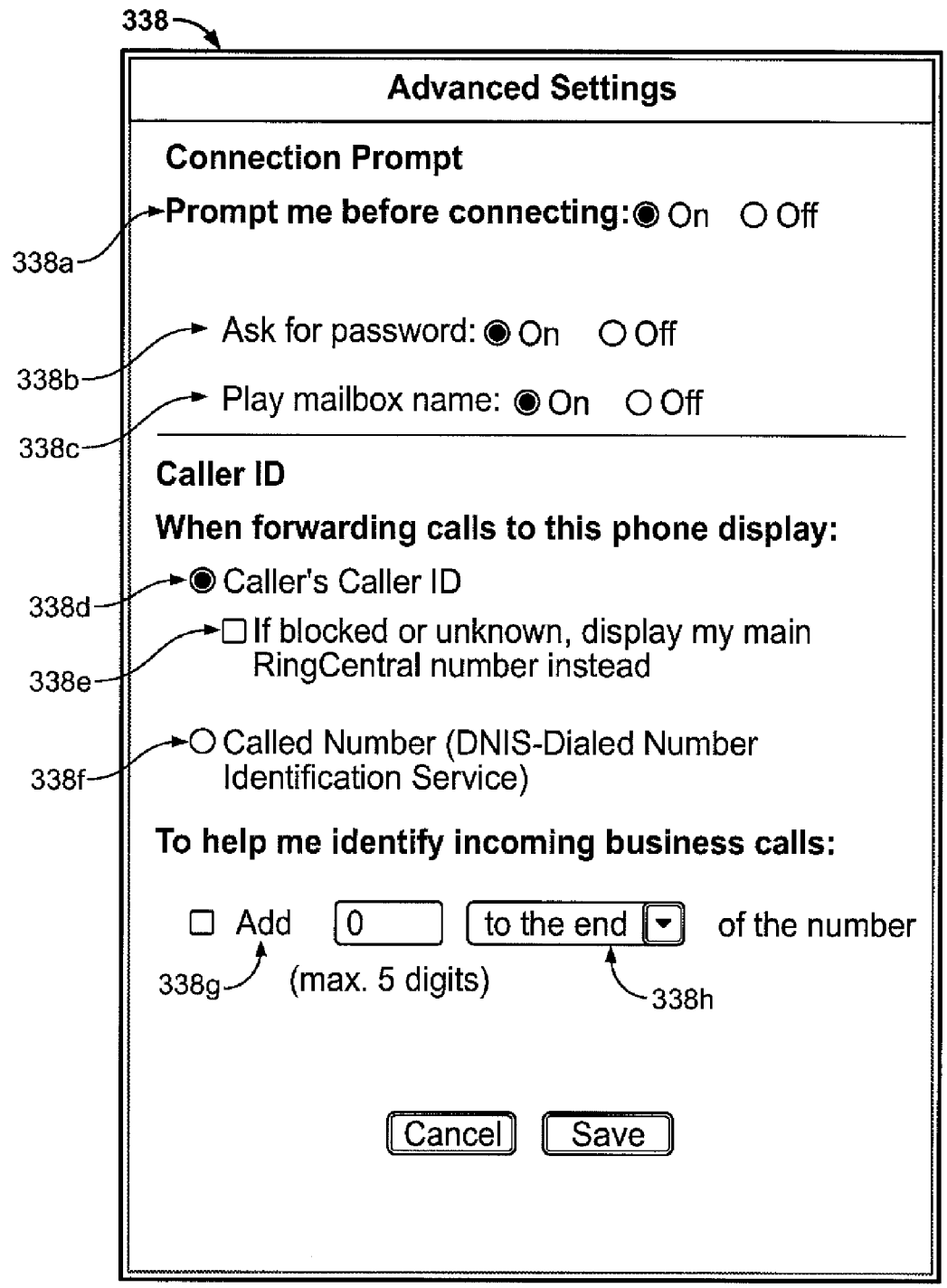
FIG. 3J shows an example of an advanced setting interface for configuring one or more advanced settings associated with an extension.

Referring to FIG. 3J, in the example shown the advanced setting interface 338 includes three options for a connection prompt. The administrator can define, under option 338a, whether the extension user should be prompted before an incoming call is forwarded to the extension user at the corresponding call forwarding number. To enhance security, an option 338b for prompting the extension user's password before the connection prompt can be effectuated. Where a call forwarding rule sends an incoming call to the voice mail of the extension user, the administrator can also define, under option 338c, whether to play the mailbox name associated with the voice mail to the incoming caller to assist the incoming caller in identifying the caller for whom a voice mail can be recorded.

As discussed previously, features for caller identification can be used for identifying the telephone number from which an incoming call originates. In some implementations, the administrator can enable option 338d to require caller IDs of all forwarding calls be displayed. If a caller ID is blocked, option 338e can be selected so that only the main number or the extension number of the extension user is displayed.

In some implementations, option 338f can be selected that allows the extension user determine which telephone number was dialed by the caller. This can assist the extension user in determining how to answer an inbound call. In some implementations, the selection of option 338f allows dialed number identification service (DNIS) to be activated so as to permit the caller to identify the number that the caller dialed (e.g., the extension or direct phone number of the extension user).

In some implementations, to help the extension user identify calls of a particular kind (e.g., business calls, personal calls, and the like), the phone number associated with an incoming call can be displayed together with one or more digits that can be appended to the end of the phone number (e.g., where the caller ID is not blocked). For example, the administrator can input "5" into the numeric entry 338g to append five digits (e.g., five zeros) to the end of an incoming number that is a business number. When an incoming call is identified as originating from a business number, the business number can be displayed to the extension user with five zeros appended to the end of the business number. Additional digits also can be appended to the beginning of a number. To do so, the administrator can click on the drop down menu 338h, which then displays a list of options including appending one or more digits at the beginning of a number. Other implementations also are possible. For example, the drop down menu 338h can include an option that allows one or more symbols instead of digits to be appended/pre-pended.

Figure 3K:
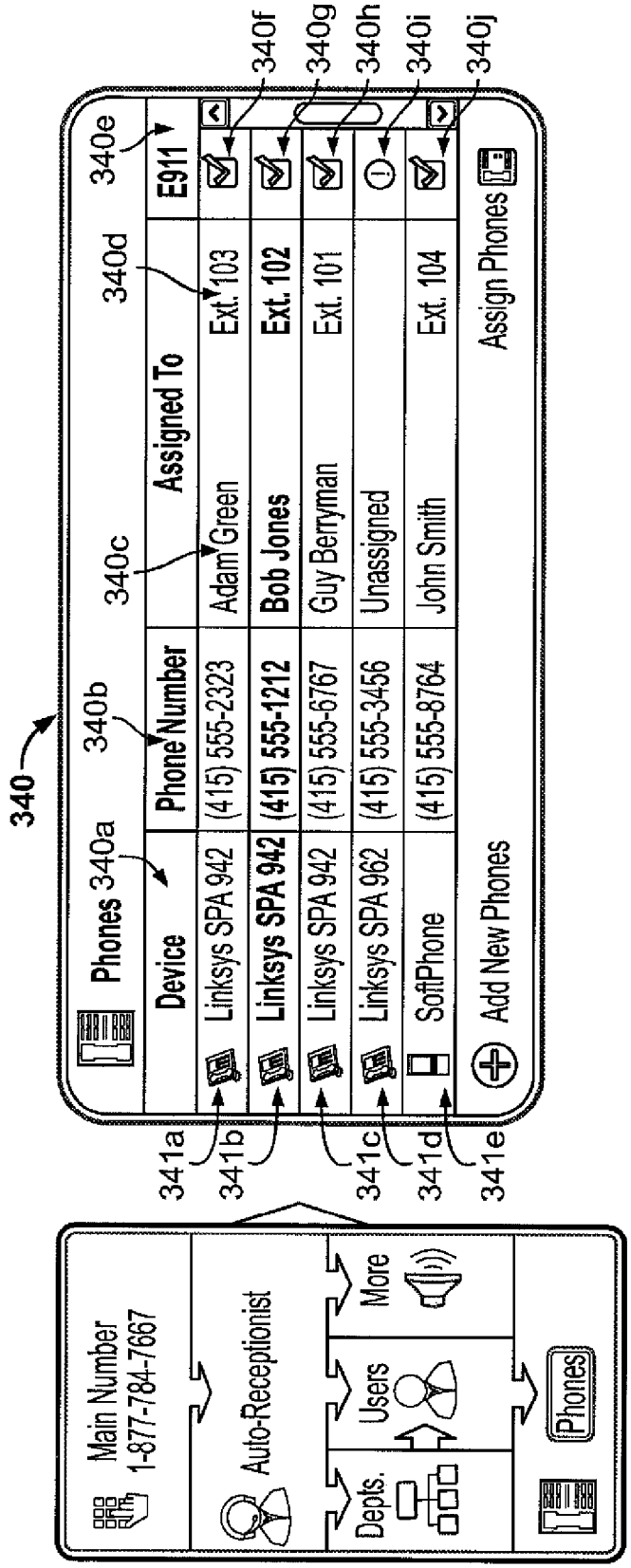
FIG. 3K shows an example of a phone device interface for configuring one or more extension devices associated with a main number.

FIG. 3K shows an example of a phone device interface 340 for configuring one or more extension devices associated with a main number. The phone device interface 340 can be invoked by activating the selectable phone interface element 310, and can be used to display a list of extension devices 340a, phone numbers 340b, names of extension users 340c and extensions 340d. In some implementations, data shown in the interface 340 can be automatically populated based on information provided through, for example, call handling rules.

A list of enhanced 911 (E-911) registration status indicators 340f, 340g, 340h, 340i and 340j also can be shown with other device information to indicate whether an associated extension device is registered with enhanced 911 (E-911) emergency dialing services. For example, indicators 340f-340h and 340j indicate that extension devices 341a-341c and 341e are registered with E-911 emergency dialing services, while indicator 340i indicates that extension device 341d is not registered with E-911 emergency dialing services. A registered extension device permits the emergency response personnel to receive the location of the extension device, and thus the site of the actual emergency in such a manner that the caller calling for help need not verbally provide location information.

Descriptions pertaining to the extension devices 341a-341e can be provided in the interface 340. For example, the phone device interface 340 can show that extension device 341b connected to extension user "Bob Jones" is a Linksys® device with model number "SPA 942". As another example, the phone device interface 340 can show that extension device 341e connected to extension user "John Smith" is a "Soft-Phone".

In some implementations, extension devices 341a-341e can include, for example, landline phones, mobile phones, or satellite phones, and each can include an internal or external memory for storing information or configuration data pertaining to an associated extension, extension user, network address (e.g., a fixed IP address), and unique identifier associated with the extension or extension user. Other extension devices that can be displayed in the phone device interface 340 also can include personal computers, workstations, laptop computers, game consoles, pagers, wired phones, such as POTS phones, SIP phones, VOIP phones, PBX phones, GSM phones, cellular phones, handheld devices, personal digital assistants, and the like.

To access configuration data of an extension device, the extension device can be selected to invoke a phone detail interface. FIG. 3L shows an example of a phone detail interface 342 for configuring one or more parameters associated with an extension device.

Referring to FIG. 3L, the phone detail interface 342 can display phone details associated with a selected extension device. As shown, device information pertaining to the extension device can be automatically populated into one or more fields displayed by the phone detail interface 342. For example, the device name of the extension device, and the phone number associated with the extension device can be automatically inserted into the fields for extension "104" (e.g., the device name can be inserted into the device nickname field 342a and the phone number associated with the extension device can be inserted into the phone number field 342c).

In some implementations, fields presented by the phone detail interface 342 are editable, and names and contact information of other users also can be specified for extension "104". In some implementations, an extension name field defining an extension name by which a caller can refer to this extension can be provided. For example, the name of the extension device as appeared in the vPBX network can be displayed in the device visibility field 342b as "104—John Smith". As another example, the extension name for extension 104 can be "Sales", and when a caller wishes to be transferred to the "Sales" department after being presented the option, the call can be routed to extension "104". The extension associated with the selected extension device also can be modified by the administrator using the extension field 342d. For example, the current extension of the selected extension device (e.g., extension 104 which is assigned to "John Smith") can be changed to a new extension (e.g., extension "109"). In some implementations, changes made to the extension field 342d can be reflected globally. For example, changing the extension in the extension field 342d to a new extension can cause data displayed in the extension user interface 322 to reflect the new extension (e.g., from "John Smith Ext. 104" to "John Smith Ext. 109"). As another example, the new extension can be reflected in the user interface 316 under the extension column 316b.

The administrator also can be given the option to display the caller ID of the extension device. Using the caller ID field 342f, the administrator can designate the direct phone number associated with an extension device to be displayed to callers. For example, if the direct phone number for extension "104" is "415-494-8237", then the caller ID field 342f can be populated with "415-494-8237". In some implementations, if the extension device is configured with two digital lines, then the number of the primary digital line having a higher priority can be displayed under the caller ID field 342f while the number of the secondary digital line having a lower priority can be displayed under the alternate field 342g.

The calling plan field 342e can display calling plan information associated with the extension or the main number. In some implementations, the calling plan field 342e can display information associated with the current calling plan such as, for example, types of calling plan (e.g., unlimited or pay-as-you-go), rates of charge, calling period, billing period and the like. Calling plan information also can include information associated with a call duration using a "call begin time" and a "call end time." The call begin time can include the time when the extension user answers an incoming call on the extension device, and the call end time can include the time when the extension user completes the call. Calling plan information further can include information indicating that for a fixed fee, the duration of calls occurring during a single calling period can sum up to a predetermined number of minutes during the billing period. To the extent that the calls sum up to more than the predetermined number during a billing period, an additional charge can be assessed on these calls at a particular rate.

In some implementations, each extension device can be configured with rules pertaining to emergency dialing. For example, the emergency dialing rules can provide appropriate emergency call routing. In some implementations, the emergency dialing rules can be defined using the phone detail interface 342. In some implementations, the emergency dialing rules can include parameters associated with E-911 services that can automatically associate a physical location address with the direct phone number (or extension) of the extension user.

The E-911 parameters can provide emergency response personnel with the location of the extension user, and thus the site of the actual emergency, in such a manner that the caller calling for help need not verbally provide location information. For example, if the extension device of the extension user calling for emergency assistance is a mobile device, the geographic location of the mobile device can be identified, for example, through the use of radiolocation from an associated cellular network or by a global positioning system (GPS) installed on the mobile device. E-911 services differ from traditional (e.g., non-enhanced) 911 service because E-911 services route an emergency call to a 911 dispatcher and provides the dispatcher with a geographic location (e.g., street address) from which the call is originated, while traditional 911 services routes an emergency call to a 911 dispatcher without providing the dispatcher with geographic location information indicating where the call is originated.

In some implementations, the extension user can register a location for the E-911 service through the E-911 interface element 342k. Upon selecting the E-911 interface element 342k, a E-911 location registration interface can be displayed to facilitate the registration process. FIG. 3M shows an example of a E-911 location registration interface 344.

Referring to FIG. 3M, to register a location, the administrator or the associated extension user can input the address corresponding to the extension. For example, the extension user can provide the name, street address, apartment information, city, state, zip code and country. In some implementation, the address information can be automatically retrieved from other internal sources (e.g., from other interfaces) and populated. To complete the address registration process, a checkbox 344a can be provided to indicate that the extension user whose address is being registered confirms and understands the difference between E-911 and traditional 911 services. In some implementations, a description explaining the difference between E-911 and traditional 911 services can be accessed using hyperlink 344b. Upon selecting the hyperlink 344b, a scrollable interface can be presented below the hyperlink 344b. FIG. 3N shows an example of a scrollable interface 344c providing information on E-911 and traditional 911 services.

In each of the above example interfaces, the various user interface elements are not limited to those shown and can be displayed in the form of other interface elements such as drop down lists, tables, windows, icons, radio buttons, check boxes, and the like.

Further, in some implementations the administrator or any user with administrative privileges can modify any call handling rule (e.g., to add, remove, or change a call forwarding rule or call screening rule), or any services or features before or after activation of the virtual PBX services. In some implementations, such PBX services, in addition to those discussed above, can include, without limitation, call blocking, privacy director (PD), do not disturb (DND), call waiting, call conferencing, speed dialing, call recording, queue rules and the like.

Call Handling Process

Figure 4:
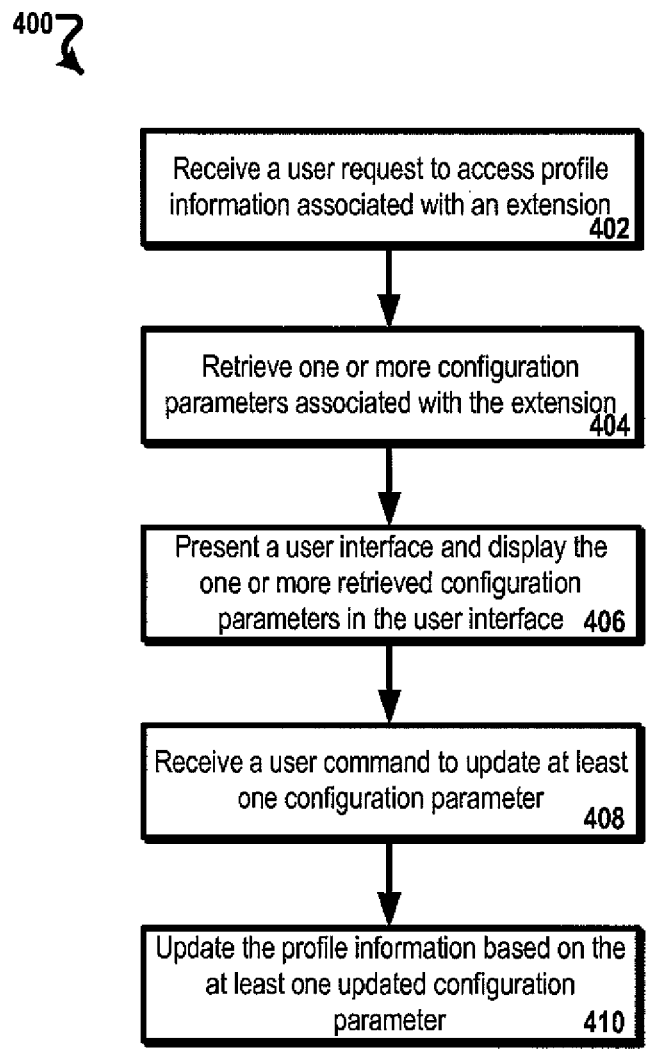
FIG. 4 shows an example of a process for displaying an interface that can be used to manage call handling rules.

FIG. 4 shows an example of a process 400 for displaying an interface that can be used to manage call handling rules. The process 400 can be performed, for example, by the call management system 100, and for clarity of presentation, the description that follows uses the virtual PBX service provider system 100 as the basis of examples for describing the process 400. However, another system, or combination of systems, can be used to perform the process 400.

Process 400 begins with receiving a user request to access profile information associated with an extension on a private branch exchange (PBX) network (402). One or more configuration parameters associated with the extension can be retrieved (404). A user interface can be presented (406). In some implementations, the user interface can display the one or more retrieved configuration parameters in the interface. A user command to update at least one configuration parameter can be received (408). The profile information can be updated based on the at least one updated configuration parameter.

Operations 402-410 can be performed in the order listed, in parallel (e.g., by the same or a different process, substantially or otherwise non-serially), or in reverse order to achieve the same result. In other implementations, operations 402-410 can be performed out of the order shown. For example, a call-related action can be determined before updating the availability status database.

Computer Devices

Figure 5:
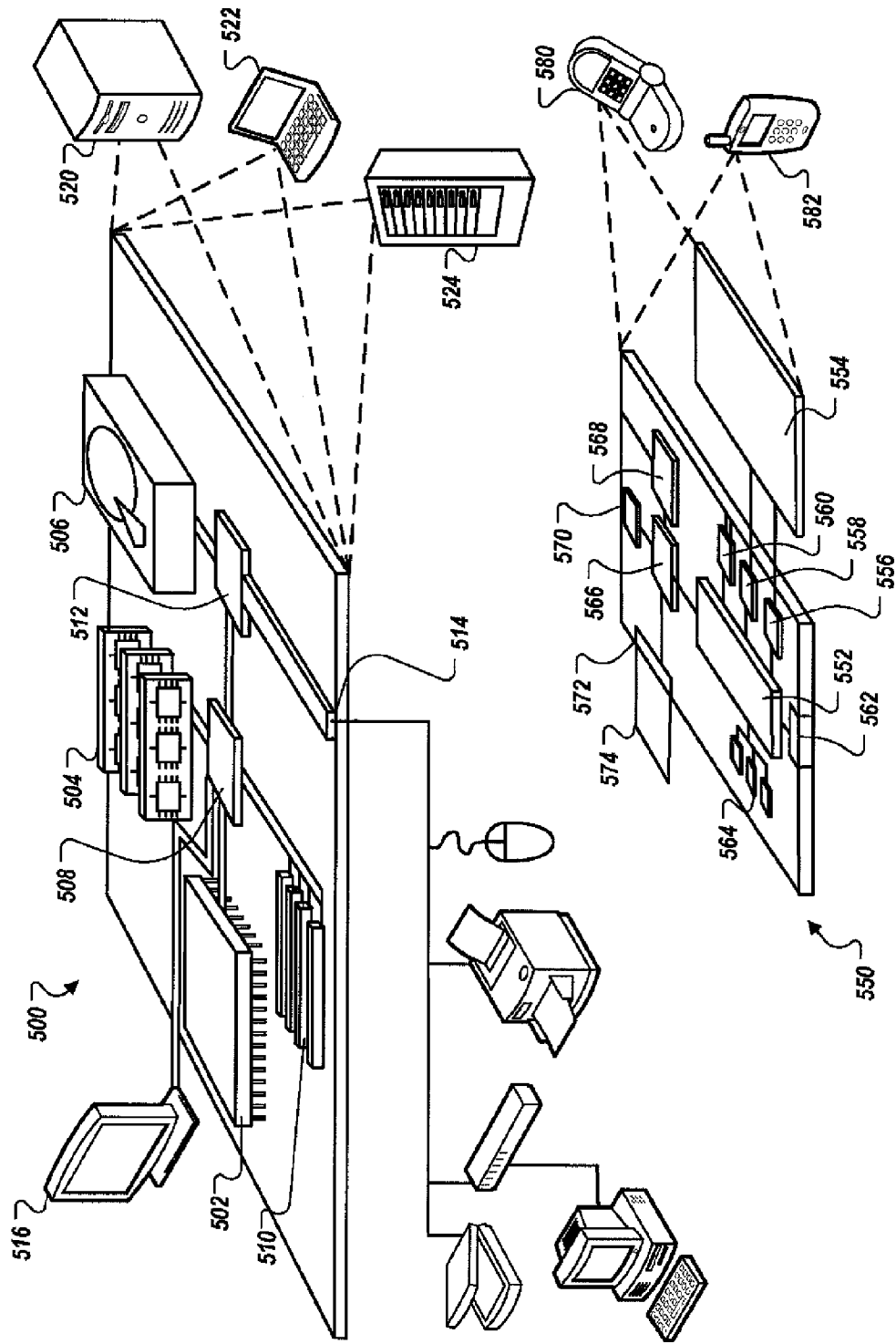
FIG. 5 is an example of a block diagram of computing devices connected to the virtual PBX service provider system shown in FIG. 1.

FIG. 5 is a block diagram of computing devices 500, 550 that may be used to implement the systems and methods described in this document, as either a client or as a server or plurality of client and servers (or extension devices or any device used to access the various user interfaces). Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 1270 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method comprising:
receiving a user request to access profile information associated with an extension on a virtual private branch exchange (PBX) network;
retrieving one or more configuration parameters associated with the extension, wherein the configuration parameters include one or more parameters associated with configuring enhanced 911 service for the extension;
presenting a user interface including displaying the one or more retrieved configuration parameters in the interface;
receiving a user command to update at least one configuration parameter, wherein the at least one configuration parameter includes a first parameter associated with configuring enhanced 911 service for the extension; and
updating the profile information based on the at least one updated configuration parameter.

2. The method of claim 1, wherein receiving the user request includes receiving a user identifier associated with the extension through a browser.

3. The method of claim 1, wherein receiving the user request includes receiving a user identifier associated with the extension through a browser.

4. The method of claim 3, wherein presenting the user interface includes presenting a web-based user interface in the browser through which the user request is received.

5. The method of claim 1, wherein the first parameter is a parameter for registering the extension for enhanced 911 service.

6. The method of claim 5, further comprising augmenting a call session initiated on the extension based on the updated profile information.

7. The method of claim 6, wherein the call session is a call session between a user of the extension and a 911 dispatcher, and wherein augmenting the call session comprises determining that the extension is registered for enhanced 911 service and providing the 911 dispatcher with geographic location information indicating where the call session is originated.

8. The method of claim 1, wherein the one or more parameters associated with configuring enhanced 911 service for the extension include a parameter indicating whether a user of the extension confirms understating of differences between enhanced 911 and traditional 911 services.

9. The method of claim 1, wherein the one or more parameters associated with configuring enhanced 911 service for the extension include an address to be provided to a 911 dispatcher when an emergency call is placed from the extension.

10. A system comprising one or more computers and one or more storage devices storing instructions that when executed by the one or more computers cause the one or more computers to perform operations comprising:
receiving a user request to access profile information associated with an extension on a virtual private branch exchange (PBX) network;
retrieving one or more configuration parameters associated with the extension, wherein the configuration parameters include one or more parameters associated with configuring enhanced 911 service for the extension;
presenting a user interface including displaying the one or more retrieved configuration parameters in the interface;
receiving a user command to update at least one configuration parameter, wherein the at least one configuration parameter includes a first parameter associated with configuring enhanced 911 service for the extension; and
updating the profile information based on the at least one updated configuration parameter.

11. The system of claim 10, wherein the first parameter is a parameter for registering the extension for enhanced 911 service.

12. The system of claim 11, the operations further comprising augmenting a call session initiated on the extension based on the updated profile information.

13. The system of claim 12, wherein the call session is a call session between a user of the extension and a 911 dispatcher, and wherein augmenting the call session comprises determining that the extension is registered for enhanced 911 service and providing the 911 dispatcher with geographic location information indicating where the call session is originated.

14. The system of claim 10, wherein the one or more parameters associated with configuring enhanced 911 service for the extension include a parameter indicating whether a user of the extension confirms understating of differences between enhanced 911 and traditional 911 services.

15. The system of claim 10, wherein the one or more parameters associated with configuring enhanced 911 service for the extension include an address to be provided to a 911 dispatcher when an emergency call is placed from the extension.

16. A non-transitory computer storage medium storing instructions that when executed by the one or more computers cause the one or more computers to perform operations comprising:
receiving a user request to access profile information associated with an extension on a virtual private branch exchange (PBX) network;
retrieving one or more configuration parameters associated with the extension, wherein the configuration parameters include one or more parameters associated with configuring enhanced 911 service for the extension;
presenting a user interface including displaying the one or more retrieved configuration parameters in the interface;
receiving a user command to update at least one configuration parameter, wherein the at least one configuration parameter includes a first parameter associated with configuring enhanced 911 service for the extension; and
updating the profile information based on the at least one updated configuration parameter.

17. The computer storage medium of claim 16, wherein the first parameter is a parameter for registering the extension for enhanced 911 service.

18. The computer storage medium of claim 17, the operations further comprising augmenting a call session initiated on the extension based on the updated profile information.

19. The computer storage medium of claim 18, wherein the call session is a call session between a user of the extension and a 911 dispatcher, and wherein augmenting the call session comprises determining that the extension is registered for enhanced 911 service and providing the 911 dispatcher with geographic location information indicating where the call session is originated.

20. The computer storage medium of claim 16, wherein the one or more parameters associated with configuring enhanced 911 service for the extension include an address to be provided to a 911 dispatcher when an emergency call is placed from the extension.

* * * * *